United States Patent [19]
Iizuka et al.

[11] Patent Number: 5,933,595
[45] Date of Patent: Aug. 3, 1999

[54] COMPUTER APPARATUS HAVING ELECTRICALLY REWRITABLE NONVOLATILE MEMORY, AND NONVOLATILE SEMICONDUCTOR MEMORY

[75] Inventors: Yutaka Iizuka; Kinya Morinouchi, both of Nara, Japan

[73] Assignee: Sharp Kabushiki Kaisha, Osaka, Japan

[21] Appl. No.: 08/879,885

[22] Filed: Jun. 20, 1997

[30] Foreign Application Priority Data

Jun. 20, 1996 [JP] Japan .................................. 8-160010
Jun. 20, 1996 [JP] Japan .................................. 8-160011

[51] Int. Cl.$^6$ .............................. G06F 11/28; G06F 9/06
[52] U.S. Cl. ................... 395/183.11; 711/164; 711/155; 395/183.01; 395/183.18
[58] Field of Search ..................... 395/183.11, 183.18, 395/188.01; 711/164, 155

[56] References Cited

U.S. PATENT DOCUMENTS 4,864,542  9/1989  Oshima et al. ................... 365/189.01
5,386,541  1/1995  Moridaira .
5,469,564  11/1995  Junya ................................ 395/188.01
5,596,738  1/1997  Pope .
5,603,056  2/1997  Totani ..................................... 395/828

FOREIGN PATENT DOCUMENTS 5-342094  12/1993  Japan .
6-139064   5/1994  Japan .

*Primary Examiner*—Ly V. Hua

[57] ABSTRACT

When the contents of a flash ROM which is an electrically rewritable nonvolatile memory are rewritten, after an IPL program for rewriting stored in the flash ROM is transferred to a RAM, mapping of memory space is switched by a switching control circuit. The IPL program transferred to the RAM is protected. The contents of the flash ROM are erased by use of the IPL program, and an updated program supplied through an RS-232C interface is written into the flash ROM. When a bug is caused due to static electricity in the IPL program stored in the flash ROM, an EPROM which is a nonvolatile memory element is attached, an IPL program stored in the EPROM is executed, and the IPL program stored in the EPROM is directly transferred to the flash ROM.

21 Claims, 14 Drawing Sheets

F I G. 1
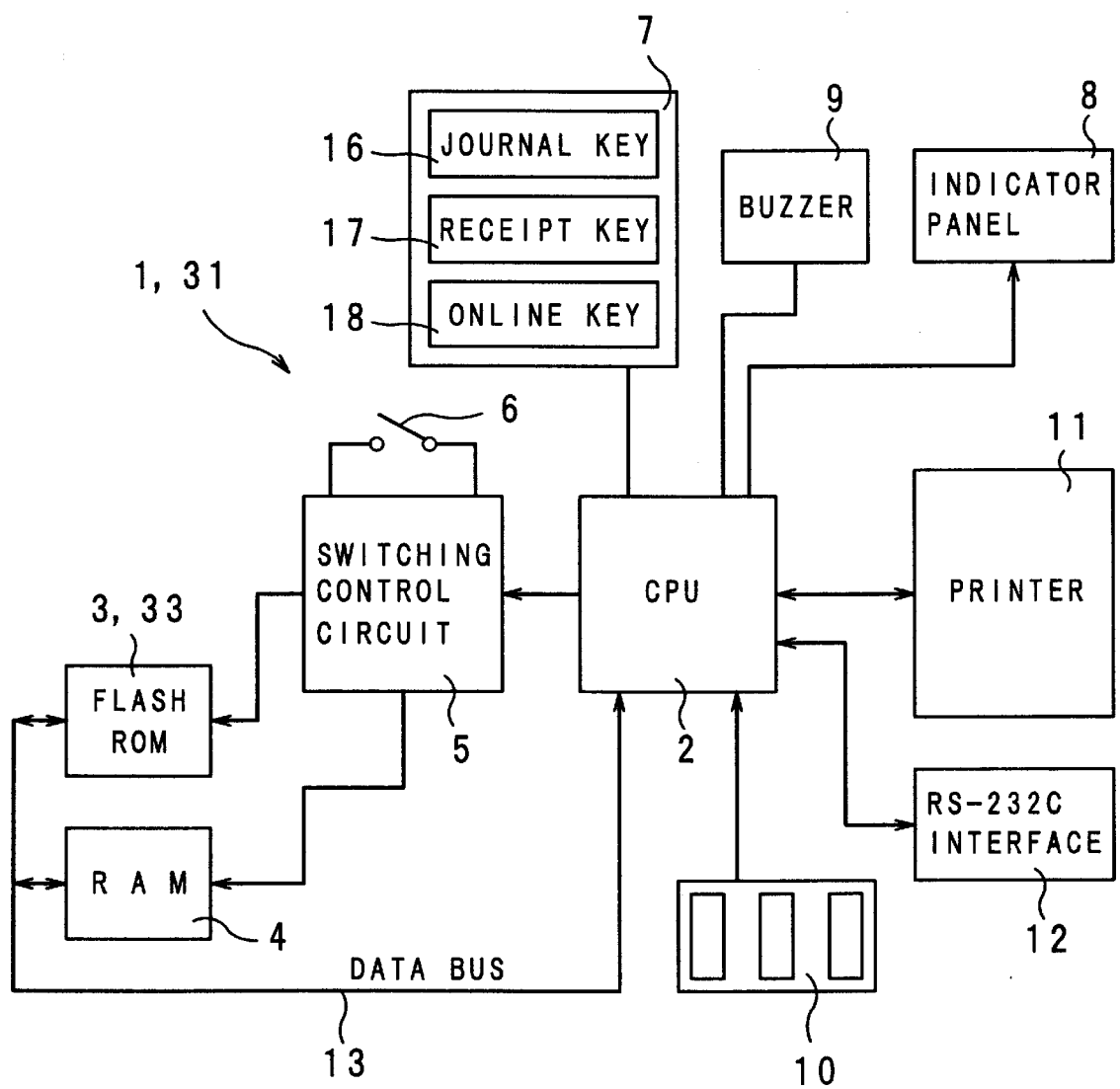

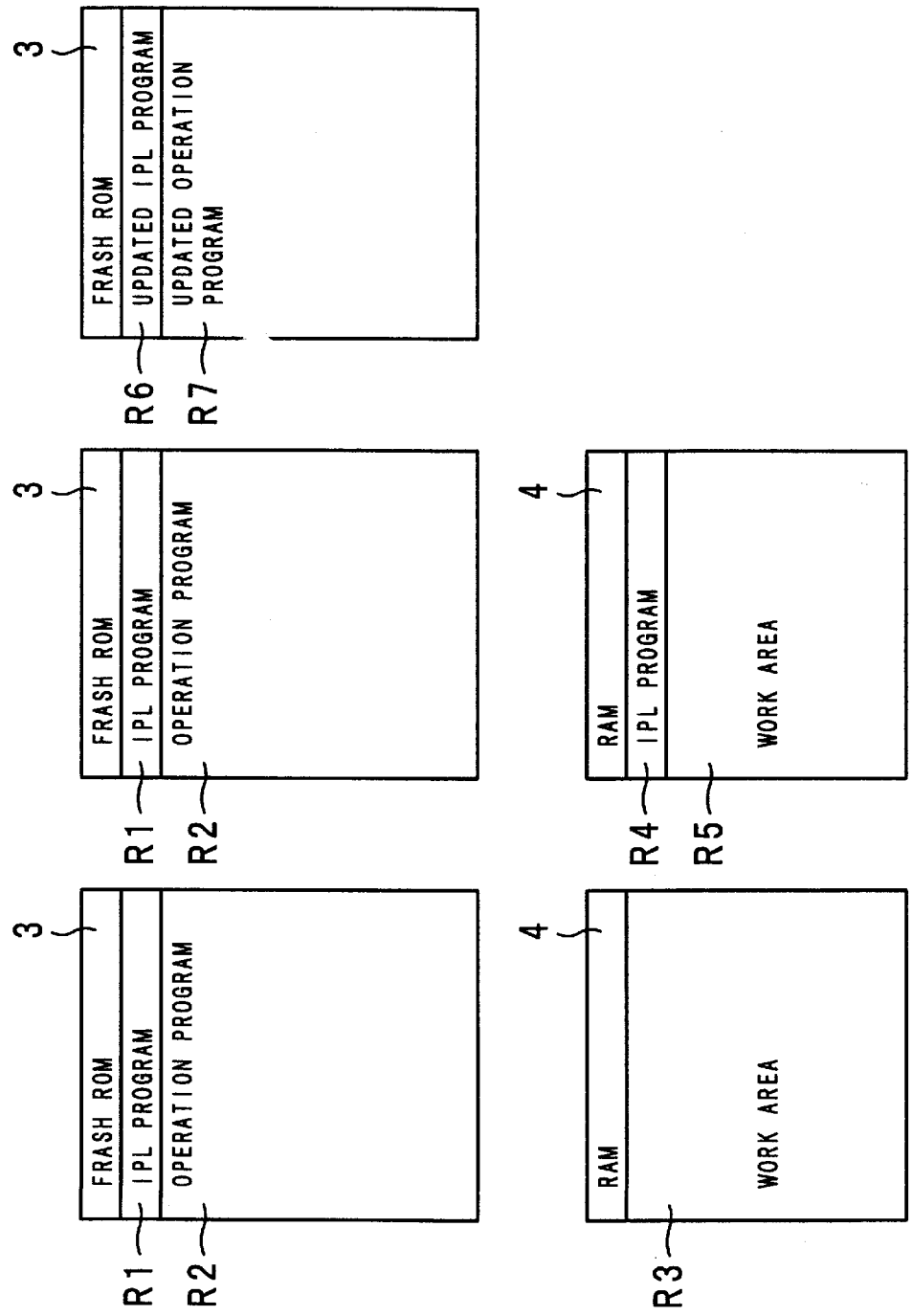

| MEMORY AREA | 1ST MODE | 2ND & 3RD MODES |
|---|---|---|
| AREA 0 | FLASH ROM | E-P ROM |
| AREA 1 | FOR EXTENSION | FOR EXTENSION |
| AREA 2 | RAM | RAM |
| AREA 3 | DIP SWITCH, ETC. | DIP SWITCH, ETC. |
| AREA 4 | FOR EXTENSION | FOR EXTENSION |
| AREA 5 | UNUSED | FLASH ROM |
| AREA 6 | UNUSED | UNUSED |
| AREA 7 | UNUSED | UNUSED |

COMPUTER APPARATUS HAVING ELECTRICALLY REWRITABLE NONVOLATILE MEMORY, AND NONVOLATILE SEMICONDUCTOR MEMORY

BACKGROUND OF THE INVENTION

1. Field of the Invention

The present invention relates to a computer apparatus being suitable for use in a printer apparatus and having an electrically rewritable nonvolatile memory for writing an operation program thereto, and a nonvolatile semiconductor memory being suitable for use in the computer apparatus.

2. Description of the Related Art

Conventionally, in a microcomputer apparatus, to perform the processing of the entire apparatus, a program previously stored in a normal read only memory (hereinafter, abbreviated to as ROM) is executed by a central processing unit (hereinafter, abbreviated to as CPU). In recent years, as the ROM, a flash ROM which is a type of an electrically rewritable nonvolatile memory has widely been used in printer apparatuses and electronic cash registers. The use of an electrically erasable programmable ROM (EEPROM) such as the flash ROM instead of the normal ROM makes it unnecessary to hardware-replace the ROM chip when it is necessary to correct a bug of the stored program. This is because the contents in the EEPROM can easily be software-corrected with the EEPROM being mounted on the microcomputer apparatus. In erasing the contents in the EEPROM and writing data to the EEPROM, however, an operation is necessary which is different from the mere readout of the contents in the memory. Since the flash ROM has both the ease-of-use of the EEPROM and the cost effectiveness of an erasable programmable ROM (EPROM) which can be formed of a transistor having a single memory cell, the range of use of the flash ROM has been increasing.

In the microcomputer apparatus, a program which enables rewriting of the flash ROM is stored as an initial program loader (hereinafter, abbreviated as IPL) of the apparatus. When the IPL is erased due to an external factor such as static electricity, an IC card or a memory board storing the IPL therein is externally connected to the apparatus and the IPL is temporarily stored in a readable and writable memory such as a random access memory (hereinafter, abbreviated as RAM) in the apparatus. By using the IPL, the IPL of the microcomputer apparatus is recovered and it is checked whether the apparatus has trouble or not.

As the prior art, an arrangement is known such that a static RAM card is externally connected to the microcomputer apparatus and after flash ROM rewriting data stored in the static RAM card is temporarily transferred to the RAM in the microcomputer apparatus, erasing of the flash ROM, data writing and collation are performed. An example of the prior art is disclosed in Japanese Laid-open Patent Application H6-139064. In this example, a control program for controlling the operation of electronic apparatuses is stored in the flash ROM and the IPL program is stored in the normal ROM. The IPL program includes a system booting program which operates at power-on, and a flash ROM rewriting program.

When a bug, i.e. a faulty portion is found in the control program stored in the flash ROM, in order to rewrite the control program, a static RAM card storing a debugged control program therein is attached to a memory card connector provided on the body of the electronic apparatus. When the static RAM card is attached, the system booting program included in the IPL program in the ROM determines that the static RAM card has control program data for rewriting the flash ROM, so that control is transferred to the control program included in the IPL program in the ROM. Then, based on the flash ROM rewriting program, the debugged control program is read from the static RAM card and stored in the internal RAM. When power for rewriting data is supplied to the flash ROM, the control program stored in the flash ROM is erased and the debugged control program stored in the internal RAM is written into the flash ROM.

Moreover, an apparatus has been proposed where instead of providing a ROM used specifically for storing the IPL program therein, the IPL program is stored in a rewritable nonvolatile semiconductor memory or in a flash ROM. The IPL program includes a rewriting program for changing an application program. By transferring the rewriting program to the RAM and executing the program at the RAM, the contents in the flash ROM are changed.

In an apparatus where an application program and the IPL program are stored in an electrically rewritable memory such as the flash ROM or the rewritable nonvolatile semiconductor memory, the contents in the flash ROM unintentionally can be rewritten due to an external factor such as static electricity or noise. When abnormality occurs in the application program, the application program can be rewritten into the ROM by executing the IPL program. However, when abnormality occurs in the IPL program, it is impossible to write the normal program into the apparatus.

For example, a computer apparatus disclosed in Japanese Laid-open Patent Application H5-342094 uses a technology which solves this problem. The computer apparatus comprises an electrically rewritable ROM storing an application program and the IPL program therein and means for deterring the output of a chip select signal for selecting a ROM when the apparatus is reset.

When abnormality occurs in the IPL program of the computer apparatus, a memory card storing the normal IPL program therein is connected to the computer apparatus. By resetting the computer apparatus after the memory card is connected, the memory card is selected by an output from the deterring means, so that the normal memory content changing program is executed from the IPL program stored in the memory card. By the memory content changing program, the application program and the IPL program are written into the ROM of the computer apparatus.

For the prior art using an IC card such as the static RAM card, an interface unit used specifically for the IC card and a connector for connecting the IC card are necessarily provided in the microcomputer apparatus. When the memory board is used, space is necessary for mounting the memory board and a connector is necessary for connecting the memory board. This increases the structure of the microcomputer apparatus and increases the cost. In addition, since erasing of the flash memory, writing and collation are performed after the rewriting program is transferred to the RAM, a long time is required.

For the prior art, an IC card or a memory board is necessary which has a data bus width the same as the data bas width of the microcomputer apparatus. That is, when the data bus width of the microcomputer apparatus is 16 bits, a 16-bit IC card or memory board, or two 8-bit IC cards or memory boards are necessary. This increases the cost of the microcomputer apparatus.

In an electronic apparatus according to the prior art of Japanese Laid-open Patent Application H6-139064, a ROM is provided which is used specifically for storing the memory content changing program therein, so that the number of parts of the electronic apparatus increases to increase the cost of the parts. Another method is to connect to the apparatus a memory board storing the memory content changing program therein to rewrite the memory content changing program. For this method, however, space for mounting the board and a connector for connecting the board are necessary.

SUMMARY OF THE INVENTION

An object of the invention is to provide a computer apparatus having an electrically rewritable nonvolatile memory which operates according to an operation program stored in the electrically rewritable nonvolatile memory, the computer apparatus being simple and highly reliable and capable of executing a memory content changing program for rewriting the operation program.

Another object of the invention is to provide a microcomputer apparatus having a nonvolatile memory, the microcomputer apparatus being capable of efficiently recovering the rewritable nonvolatile memory from a faulty condition with a simple structure.

The invention provides a computer apparatus having an electrically rewritable nonvolatile memory, the computer apparatus comprising:

a nonvolatile memory which is electrically rewritable and into which an operation program for the computer apparatus including a program for changing memory contents is written;

a random access memory of which memory contents are able to be read or written;

program transferring means for transferring the program to change memory contents from the nonvolatile memory to the random access memory;

change instructing means for instructing an operation to change memory contents of the nonvolatile memory; and controlling means, in response to a memory content changing instruction from the change instructing means, for controlling the operation so that contents of the nonvolatile memory are electrically rewritten according to the memory content changing program transferred from the nonvolatile memory to the random access memory by the program transferring means.

According to the invention, an operation program for operating the computer apparatus is written to the electrically rewritable nonvolatile memory of the computer apparatus. When the contents in the nonvolatile memory are changed, the change instructing means instructs the start of the operation to change the memory contents. By being supplied with the instruction to change the memory contents, the transferring means reads out the memory content changing program from the operation program stored in the nonvolatile memory and writes the memory content changing program into the random access memory. The controlling means executes the memory content changing program transferred to the random access memory to electrically rewrite the contents in the nonvolatile memory. Thus, since the program executed when the contents in the electrically rewritable nonvolatile memory are changed is executed after being transferred from the nonvolatile memory to the random access memory when the operation program is rewritten, the operation program may be rewritten without the need to provide in the computer apparatus a ROM used specifically for storing the memory content changing program therein.

That is, according to the invention, since the memory content changing program executed when the contents in the nonvolatile memory are changed is executed after being transferred from the nonvolatile memory to the RAM when the operation program is rewritten, it is unnecessary to provide in the computer apparatus a nonvolatile memory used specifically for storing the memory content changing program therein, so that the number of parts of the computer apparatus is reduced and the cost of the product is cut down.

Moreover, the invention is a microcomputer apparatus provided with a rewritable nonvolatile memory, comprising:

a central processing unit; and a rewritable nonvolatile memory into which an execution program to be rewritten is previously stored, the apparatus further comprising:

a nonvolatile memory element in which a program for rewrite operation of the rewritable nonvolatile memory and an execution program to be rewritten are previously stored;

a connecting member to which the nonvolatile memory element is detachably attachable; and controlling means for controlling erase and write operations, by inserting the nonvolatile memory element into the connecting member, the erase operation erasing contents of the rewritable nonvolatile memory, the write operation transferring the execution program to be rewritten from the nonvolatile memory element to the rewritable nonvolatile memory are performed according to the rewriting program stored in the nonvolatile memory element.

According to the invention, when a malfunction occurs in the execution program written to the rewritable nonvolatile memory, the nonvolatile memory element storing therein the execution program written to the nonvolatile memory may be connected to the data bus of the microcomputer apparatus by being inserted into the connecting member, for example, a ROM socket. When the nonvolatile memory element is connected, according to the rewriting program stored in the nonvolatile memory element, the controlling means erases the contents in the rewritable nonvolatile memory and directly transfers the execution program stored in the nonvolatile memory element to the rewritable nonvolatile memory. Thus, since the connecting member for connecting the nonvolatile memory element is realized with a simple structure such as the ROM socket instead of the interface and the connector necessary for the prior art, the nonvolatile memory may be rewritten with a simple structure having a small circuit scale. Since it is unnecessary to temporarily store the program written to the nonvolatile memory element in a memory such as a RAM, the nonvolatile memory may efficiently be rewritten.

That is, according to the invention, when the nonvolatile memory element is attached to the connecting member in the case where abnormality occurs in the execution program written to the rewritable nonvolatile memory, according to the rewriting program stored in the nonvolatile memory element, the controlling means erases the contents in the rewritable nonvolatile memory and directly transfers the execution program stored in the nonvolatile memory element to the rewritable nonvolatile memory. Thus, since the connecting member for connecting the nonvolatile memory element is realized with a simple structure such as the ROM socket instead of the interface and the connector necessary for the prior art, the nonvolatile memory may be rewritten with a simple structure having a small circuit scale. Since it is unnecessary to temporarily store the program written to the nonvolatile memory element in a memory such as a RAM, the nonvolatile memory may efficiently be rewritten.

BRIEF DESCRIPTION OF THE DRAWINGS

Other and further objects, features, and advantages of the invention will be more explicit from the following detailed description taken with reference to the drawings wherein:

FIG. 1 is a block diagram showing the electrical structure of remote printers 1 and 33 according to first and second embodiments of the invention;

FIG. 4A shows the locations of the programs stored in a flash ROM 3 and a RAM 4 during the normal operation of the remote printer 1 of FIG. 1;

FIG. 4B shows the locations of the programs stored in the flash ROM 3 and the RAM 4 during the memory content changing operation of the remote printer 1 of FIG. 1;

FIG. 4C shows the locations of the programs stored in the flash ROM 3 and the RAM 4 after the memory content changing operation of the remote printer 1 of FIG. 1;

DETAILED DESCRIPTION OF THE PREFERRED EMBODIMENTS

Figure 2:
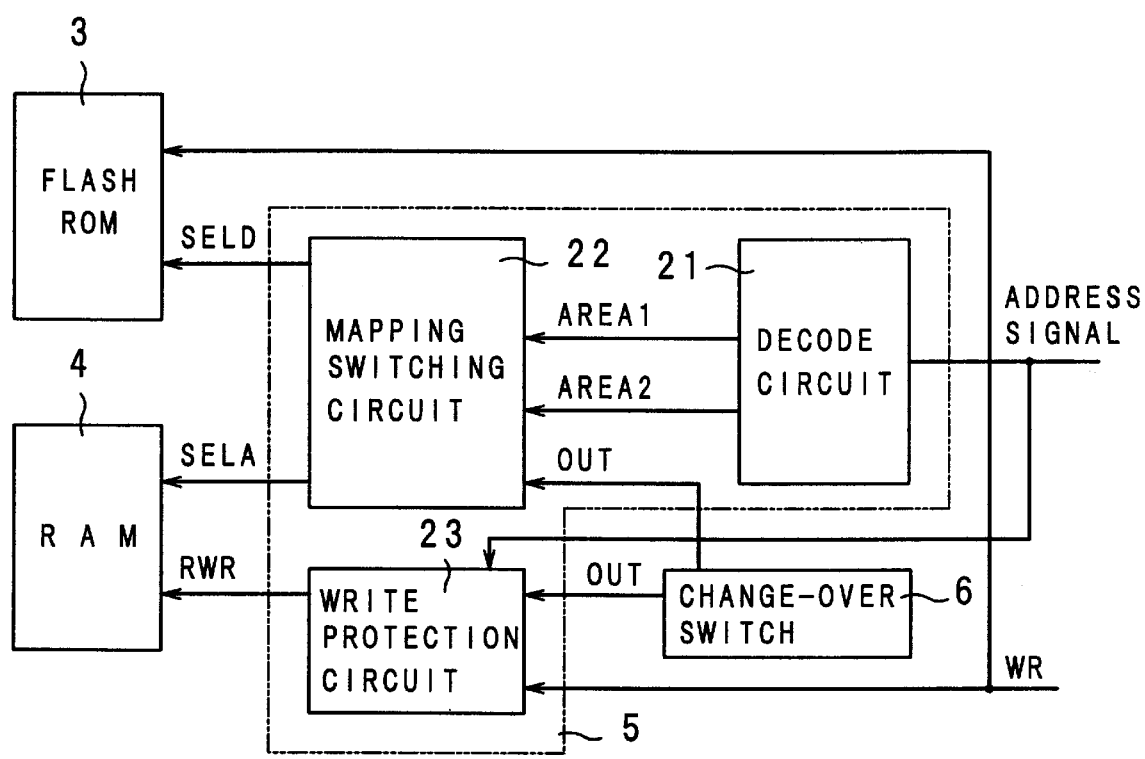
FIG. 2 is a block diagram showing the structure of a switching control circuit 5 of FIG. 1.

Now referring to the drawings, preferred embodiments of the invention are described below.

FIG. 1 shows the electrical structure of a remote printer 1 according to a first embodiment of the invention. The remote printer 1 comprises a CPU 2, a flash ROM 3, a RAM 4, a switching control circuit 5, a change-over switch 6, an input keypad 7, an indicator panel 8, a buzzer 9, a DIP switch 10, a printer 11, and an RS-232C interface 12.

The remote printer 1 is a printer used as an externally-connected printer for an information processor such as an electronic cash register, and performs processing such as printing based on commands and data received through the RS-232C interface 12 which is an interface for external connection. In the remote printer 1, by changing the setting of the subsequently-described DIP switch 10, the communication rate and the communication data format can be set according to the type of the information processor.

The CPU 2 controls the input and output of signals at the flash ROM 3, the RAM 4, the input keypad 7, the indicator panel 8, the buzzer 9, the printer 11 and the RS-232C interface 12. Moreover, the CPU 2 processes data supplied from an external computer apparatus through the RS-232C interface 12 and supplies the data to the printer 11 as data for printing.

The flash ROM 3 is a type of the electrically rewritable nonvolatile semiconductor memory, and is capable of being rewritten in blocks of a predetermined size into which the memory area is divided. For the flash ROM 3, it is unnecessary to back up the memory contents when the power is shut off. Moreover, the flash ROM 3 stores therein the IPL program including a subsequently-described program for changing memory contents, and an operation program for the remote printer 1. The IPL program includes a program for initializing the work area of the RAM 4 and the program for changing memory contents executed when the contents in the flash ROM 3 are rewritten. The change-over switch 6 is manually turned on and off by an operator who intends to rewrite the operation program. The level of an output OUT is determined according to whether the change-over switch 6 is on or off.

The input keypad 7 comprises a plurality of keys for setting the condition of the remote printer 1, for example, comprises a journal key 16, a receipt key 17 and an online key 18. The journal key 16 instructs paper conveyance on the journal side in the printer 11. The receipt key 17 instructs paper conveyance on the receipt side in the printer 11. The online key 18 is turned on when communication is performed with an external computer apparatus through the RS-232C interface 12, and is turned off when communication is not performed.

The indicator panel 8 is a panel for indicating the condition of the remote printer 1 and comprises, for example, a plurality of light emitting diodes (LEDs). The indicator panel 8 includes a power-on indicator lamp turned on at power-on and turned off at power-off, an online indicator lamp turned on when the communication line is connected and turned off when the communication line is not connected, and an error indicator lamp turned on when an error occurs in rewriting the flash ROM 3. The buzzer 9 is a device for informing the operator of the condition of the remote printer 1 by sound. For example, in rewriting the flash ROM 3, when rewriting is completed normally, the buzzer 9 is sounded once, and when abnormality occurs, the buzzer 9 is sounded intermittently to inform the operator of an error.

The DIP switch 10 comprises a plurality of condition setting switches and is used for setting the communication rate and the communication data format. The printer 11 performs printing based on the data for printing supplied from the CPU 2. To check the setting when the remote printer 1 is tested, the printer 11 prints predetermined data read from the flash ROM 3.

Figure 3A:
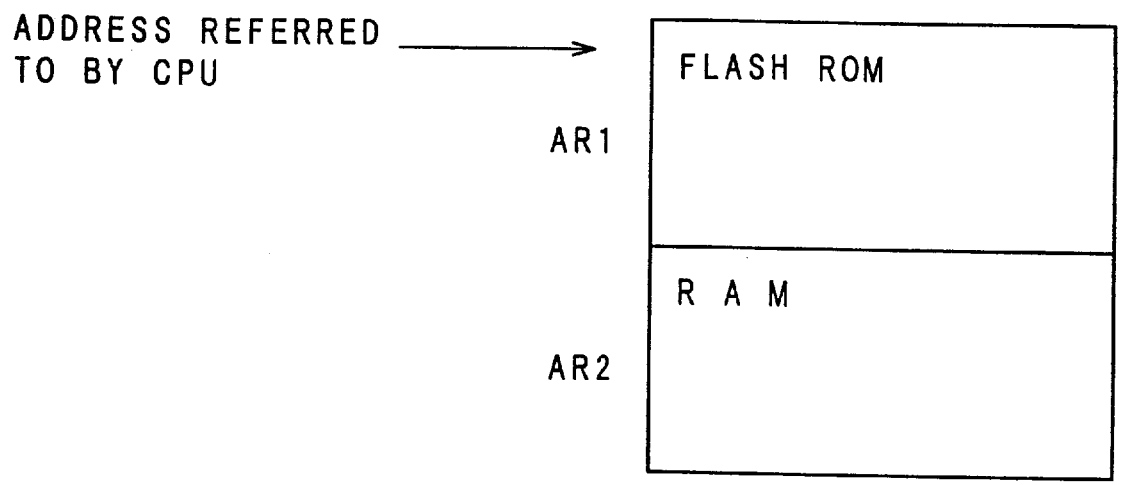
FIG. 3A shows an address mapping by the switching control circuit 5 of FIG. 1 during a normal operation.
Figure 3B:
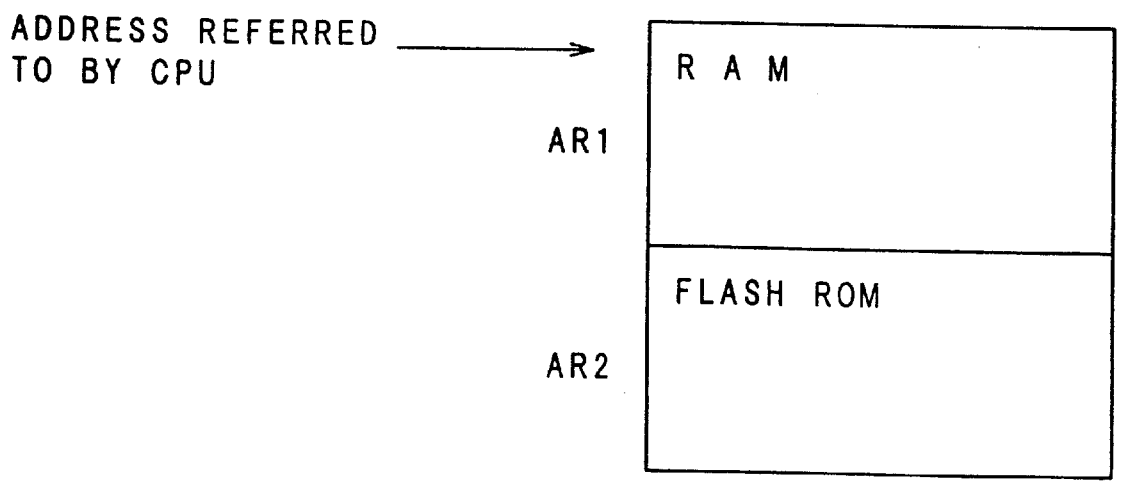
FIG. 3B shows an address mapping by the switching control circuit 5 of FIG. 1 during a memory content changing operation.

FIG. 2 is a block diagram showing the structure of the switching control circuit 5. FIGS. 3A and 3B are views of assistance in explaining a switching control by the switching control circuit 5. The switching control circuit 5 comprises a decoding circuit 21, a mapping switching circuit 22 and a write protection circuit 23.

The decode circuit 21 outputs decode signals AREA1 and AREA2 to the mapping switching circuit 22 based on an address signal supplied from the CPU 2. The mapping switching circuit 22 outputs, based on the decode signals AREA1 and AREA2 and the output OUT of the change-over switch 6, a signal representative of which one of the flash ROM 3 and the RAM 4 is referred to by the CPU 2 after the reset of the CPU 2. To the flash ROM 3, a chip select signal SEL0 for the flash ROM is supplied and to the RAM 4, a chip select signal SELA for the RAM is supplied.

With respect to the chip select signals SEL0 and SELA, either one of them is high. The flash ROM 3 and the RAM 4 are allocated to an area AR1 when the supplied chip select signal is high, and to an area AR2 when the supplied chip select signal is low.

The mapping switching circuit 22, in response to the decode signals AREA1 and AREA2 of the address supplied from the decode circuit 21, outputs the chip select signals SEL0 and SELA to the flash ROM 3 and the RAM 4 according to whether the change-over switch 6 is on or off. When the change-over switch 6 is off, as shown in FIG. 3A, the flash ROM 3 is allocated to the area AR1 and the RAM 4, to the area AR2. When the change-over switch 6 is on, as shown in FIG. 3B, the RAM 4 is allocated to the area AR1 and the flash ROM 3, to the area AR2. After the reset, the CPU 2 starts the execution of a program with reference to the first address of the memory allocated to the area AR1.

The write protection circuit 23 is supplied with a writing signal WR from the CPU 2 and the output OUT of the change-over switch 6. When the writing signal WR supplied from the CPU 2 becomes high to request writing to the RAM 4, according to the level of the output OUT, whether the writing to the RAM 4 is permitted or not is determined and the level of a writing signal RWR for the RAM is determined.

When it is determined that the change-over switch 6 is off based on the output OUT of the change-over switch 6, the write protection circuit 23 does not permit writing to the area of the RAM 4 where the IPL program is copied. When it is determined that the change-over switch 6 is on based on the output OUT of the change-over switch 6, the write protection circuit 23 permits writing to the RAM 4 when the writing signal WR becomes high.

FIGS. 4A, 4B and 4C show the locations of the programs stored in the flash ROM 3 and the RAM 4 of the remote printer 1. FIG. 4A shows the flash ROM 3 and the RAM 4 before the memory content changing program included in the IPL program is executed. In the flash ROM 3, the IPL program is stored in an area R1 starting at the first address, and the operation program is stored in an area R2. In the RAM 4, the entire area R3 is used as a work area. In the work area of the RAM 4, a key buffer is set for storing key data representative of keys input by use of, for example, the input keypad 7.

When the flash ROM 3 is allocated to the area AR1 as shown in FIG. 3A, immediately after the reset, the IPL program stored in the area R1 of the flash ROM 3 is read out and executed. By the IPL program, the operation program stored in the area R2 is read out and executed.

FIG. 4B shows the flash ROM 3 and the RAM 4 when the memory content changing changing program is being executed. When the memory content changing program is executed, the IPL program stored in the area R1 of the flash ROM 3 is read out and stored in an area R4 starting at the first address of the RAM 4. An area R5 succeeding the area R4 is used as the work area.

After the IPL program is stored in the area R4 of the RAM 4, the change-over switch 6 is switched to determine the areas AR1 and AR2 of the memory space as shown in FIG. 3B. For example, when the CPU 2 is reset after the areas AR1 and AR2 are determined, the IPL program in the area R4 is executed.

When the execution of the memory content changing program is instructed while the IPL program in the area R4 is being executed, the IPL program and the operation program stored in the flash ROM 3 are erased. After the programs in the flash ROM 3 are erased, the memory content changing program stores updated IPL and operation programs supplied through the RS-232C interface 12 in a program data receiving buffer reserved in the work area of the area R5 of the RAM 4. The updated IPL and operation programs are read from the program data receiving buffer by the memory content changing program and, as shown in FIG. 4C, written to and stored in areas R6 and R7 of the flash ROM 3, respectively.

Figure 5:
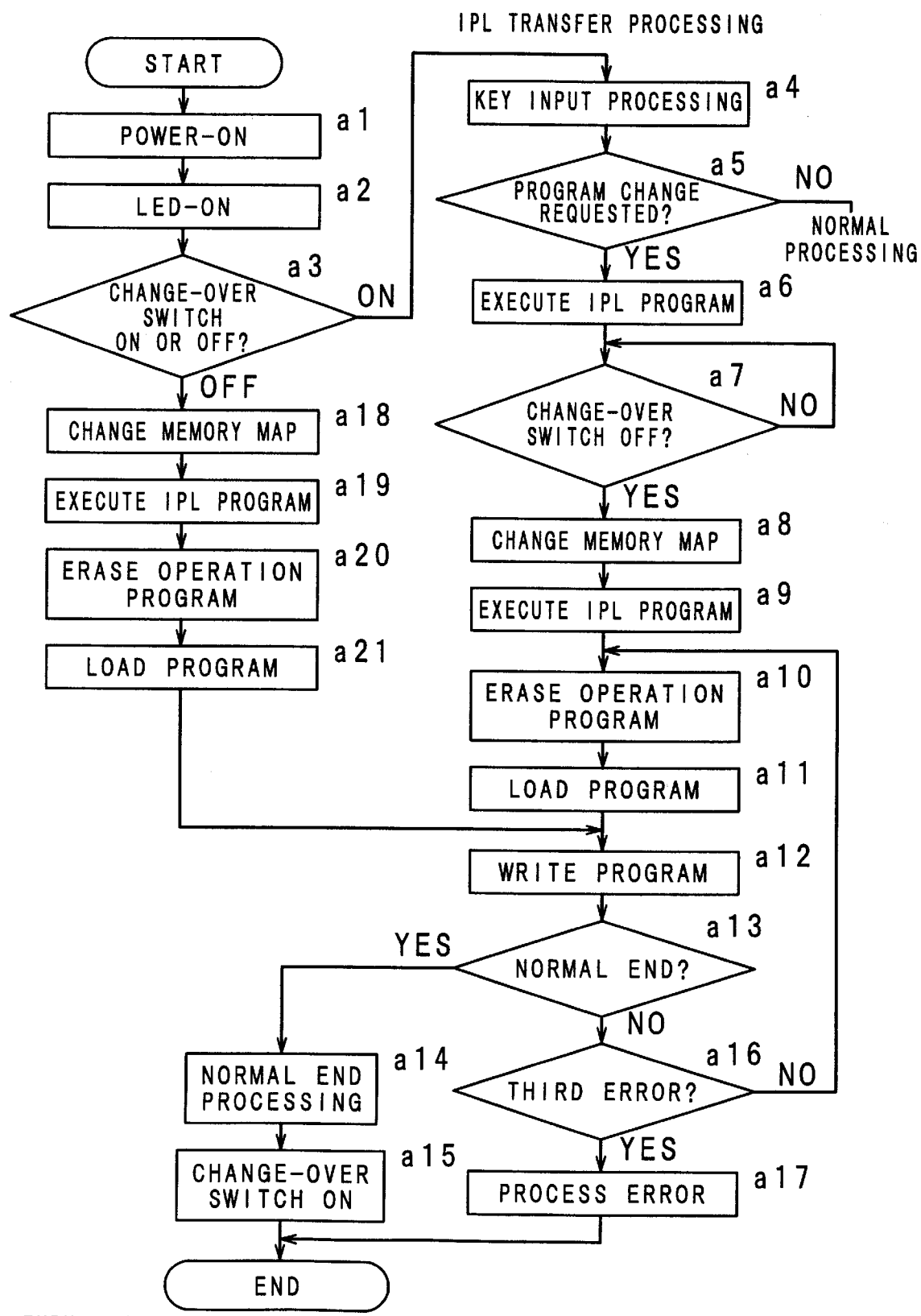
FIG. 5 is a flowchart of assistance in explaining an operation of the remote printer 1 of FIG. 1.

FIG. 5 is a flowchart of assistance in explaining an operation of the remote printer 1. At step a1, power supply is started, for example, by turning on the power switch. At step a2, an LED serving as a power indicator lamp of the indicator panel 8 is turned on to indicate that power supply has been started.

At step a3, it is determined whether the change-over switch 6 is on or off. When the change-over switch 6 is on, the process proceeds to step a4. During the normal operation, since the change-over switch 6 is on, the area accessed by the CPU 2 immediately after the reset is the area R1 of the flash ROM 3. At step a4, key data input from the input keypad 7 are read out and stored in the key buffer reserved in the work area of the RAM 4. A processing based on the key data is performed by a key processing program.

At step a5, it is determined whether or not the key data input from the input keypad 7 represents a request for a program change. When the key data do not represent the request for a program change, the operation program in the flash ROM 3 is read out and executed. When the key data represent the request for a program change, the process proceeds to step a6.

At step a6, the memory content changing program in the IPL program is executed, and the IPL program stored in the area R1 of the flash ROM 3 is read out and written into the area R4 of the RAM 4. At step a7, it is determined whether the change-over switch 6 is off or not. When the change-over switch is turned off by the operator, the process proceeds to step a8. When the change-over switch 6 is on, the processing at step a7 is continued.

At step a8, based on the determination that the change-over switch 6 is off, the memory map is changed as shown in FIG. 3B and the memories allocated to the areas AR1 and AR2 are changed. By the processing at step a8, the area accessed by the CPU 2 immediately after the reset is changed to the area R4 of the RAM 4. At step a9, of the programs included in the IPL program stored in the RAM 4, the memory content changing program is executed.

At step a10, the memory content changing program which is being executed erases the IPL program and the operation program stored in the flash ROM 3. At step a11, the updated IPL and operation programs supplied, for example, from an external computer apparatus is loaded through the RS-232C interface 12 and written into the program data receiving buffer reserved in the work area of the RAM 4. At step a12, the IPL program and the operation program written to the program data receiving buffer are read out and written into the flash ROM 3.

At step a13, it is determined whether or not the IPL program and the operation program are correctly written into the flash ROM 3 to end the writing program normally. Whether the programs are correctly written into the flash ROM 3 or not is determined by comparing the program data written to the flash ROM 3 and the program data stored in the RAM 4. When the program data are normally written, the process proceeds to step a14. At step a14, as a normal end processing, for example, a predetermined indicator lamp of the indicator panel 8 is turned on and the buzzer 9 is sounded in order to indicate that the rewriting is completed normally.

At step a15, the operator who follows the indicator lamp and the buzzer turns on the change-over switch 6 so that the updated IPL program written to the flash ROM 3 will be referred to at the next power-on. By the change-over switch 6 being turned on, the levels of outputs of the mapping changing circuit 22 are changed and the memory map is allocated as shown in FIG. 3A to end the process. Since the change-over switch 6 is turned on, the address which the CPU 2 will refers to first at the next power-on is the first address of the flash ROM 3.

At step a13, when it is determined that an error occurs that the program data are not normally written, the process proceeds to step a16. At step a16, it is determined whether the error is the third program data writing error or not. When it is determined that the error is the third error, the process proceeds to step a17. At step a17, since the program data are not normally rewritten, a predetermined indicator lamp of the indicator panel 8 is turned on and the buzzer 9 is sounded intermittently to inform the operator that the process ends because of an error. At step a16, when it is determined that the number of rewriting errors is less than three, the processing from step a10 is performed.

When the process ends because of the error, since the IPL program has not been written to the flash ROM 3, the CPU 2 is reset to again activate the IPL program stored in the RAM 4. At the time of the error end, since the change-over switch 6 is not turned on but remains off, the processing from step a18 is performed after the reset of the CPU 2.

At step a3, when it is determined that the change-over switch 6 is off, the process proceeds to step a18. At step a18, the memory map is changed based on the condition of the change-over switch 6. As a result of the processing at step a18, the CPU 2 refers to the area R4 of the RAM 4 at the time of the reset. At step a19, the memory content changing program in the IPL program stored in the area R4 is executed.

At step a20, the memory content changing program which is being executed erases the IPL program and the operation program stored in the flash ROM 3. The erasing of the flash ROM 3 is performed even when the CPU 2 is reset after the error end and the memory content changing program is being executed again.

At step a21, updated IPL and operation programs supplied, for example, from an external computer apparatus are loaded through the RS-232C interface 12 and written into the program data receiving buffer reserved in the work area of the RAM 4. After the IPL program and the operation program are written to the RAM 4, the processing from step a12 is performed.

As described above, according to this embodiment, in the remote printer 1, when the IPL program and the operation program stored in the flash ROM 3 are rewritten, the IPL program including the memory content changing program is written into the RAM 4 by operating a predetermined key of the input keypad 7. By executing the memory content changing program from the IPL program written to the RAM 4, the memory contents in the flash ROM 3 are erased and the programs supplied through the RS-232C interface 12 are written into the flash ROM 3. Since the memory content changing program for rewriting the contents in the flash ROM 3 is stored in the flash ROM 3 storing the operation program therein, the operation program may be rewritten without the need for a ROM used specifically for storing the memory content changing program therein, so that the number of parts is reduced.

When the memory content changing program written to the RAM 4 is executed, since the write protection circuit 23 does not permit writing to the area of the RAM 4 where the IPL program is stored, it never occurs that the program is rewritten to cause an out-of-control condition. As a result, the rewriting is performed with stability.

Since the memory referred to by the CPU 2 after the reset is determined according to the output of the mapping changing circuit 22 based on the condition of the change-over switch 6, even if an error occurs while the memory content changing program is being executed, rewriting may again be performed by resetting the CPU 2.

As described above, the first embodiment of the invention comprises protecting means for write-protecting the memory content changing program transferred to the RAM by the program transferring means for transferring a program.

According to the invention, the memory content changing program transferred to the RAM is protected by the protecting means and writing is not performed thereto. The memory content changing program is not rewritten also when the memory content changing program stored in the RAM is being executed in order to rewrite the contents in the nonvolatile memory. Although the program can become out of control when the memory content changing program stored in the RAM is rewritten due to noise and the like, since the program is protected from being rewritten by the protecting means, the memory content changing program is executed with stability.

That is, according to the invention, since the memory content changing program transferred to the RAM is protected by the protecting means and writing is not performed thereto, it is prevented that while the memory content changing program stored in the RAM is being executed, the memory content changing program stored in the RAM is rewritten due to noise and the like to cause the program to become out of control.

In this embodiment, the controlling means includes the program processing means program which operates according to a program written in a predetermined memory area of the nonvolatile memory when a changing operation is not instructed by the change instructing means, and operates according to a program stored in the memory area of the RAM to which the memory content changing program is transferred by the program transferring means when the changing operation is instructed by the change instructing means.

According to the invention, when the change instructing means does not instruct the changing operation, the program processing means of the controlling means operates according to the program written to the predetermined memory area of the electrically rewritable nonvolatile memory. When the changing operation is instructed by the change instructing means, the program processing means operates according to the contents in the RAM to which the memory content changing program is transferred by the program transferring means. Therefore, since either the program written to the predetermined memory area of the nonvolatile memory or the memory content changing program stored in the RAM is selected according to whether the changing operation is instructed by the change instructing means or not, the program stored in the nonvolatile memory or in the predetermined memory area of the RAM may be read out and executed according to the desired operation.

That is, according to the invention, since either the program written to the predetermined memory area of the nonvolatile memory or the memory content changing program stored in the memory area of the RAM is selected according to whether the changing operation is instructed by the change instructing means or not, the program stored in the nonvolatile memory or in the predetermined memory area of the RAM may be read out and executed according to the desired operation.

Figure 6:
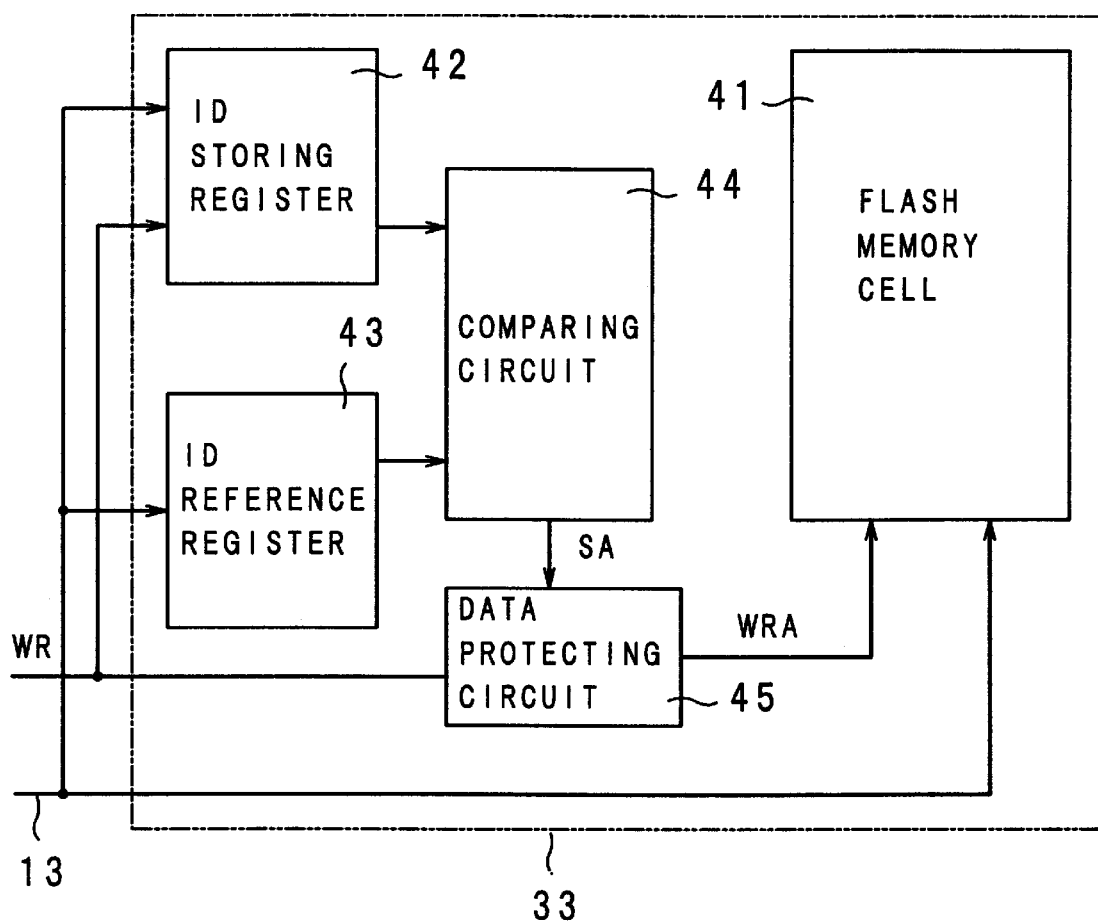
FIG. 6 is a block diagram showing the structure of a flash ROM 33 included in the remote printer 31 of FIG. 1.

FIG. 6 is a block diagram showing the structure of a flash ROM 33 included in a remote printer 31 according to a second embodiment of the invention. The remote printer 31 is the same as the remote printer 1 except that the flash ROM 3 is replaced by the flash ROM 33 and the general structure thereof is shown in FIG. 1 like the first embodiment.

The flash ROM 33 comprises a flash memory cell 41, an identification (ID) storing register 42, an ID reference register 43, a comparing circuit 44, and a data protecting circuit 45. The flash memory cell 41 is electrically rewritable and data supplied from the data bus 13 are written thereto only when a write enabling signal WRA supplied from the data protecting circuit 45 is, for example, high.

The ID storing register 42 comprises a nonvolatile memory such as a programmable read only memory (PROM) and data can be written thereto at least once. To the ID storing register 42, ID information is written which is predetermined, for example, by the manufacturer of the flash ROM 33. The ID information written by the manufacturer will hereinafter be referred to as "manufacturer ID information."

The ID reference register 43 is a register into which ID information input by the user is written, and comprises, for example, a volatile memory such as a RAM. The ID information written by the user will hereinafter be referred to as "user ID information." The user ID information is input by use of numeric keys provided as the input keypad 7 when the user writes data into the flash memory cell 41.

The comparing circuit 44 compares the ID information stored in the ID storing register 42 and the ID information stored in the ID reference register 43. When the ID information in the register 42 and the ID information in the register 43 coincide with each other, a coincidence detection signal SA is supplied to the data protecting circuit 45. When the writing signal WR is supplied from the CPU 2 with the coincidence detection signal SA being supplied, the data protecting circuit 45 outputs the write enabling signal WRA to the flash memory cell 41.

Figure 7:
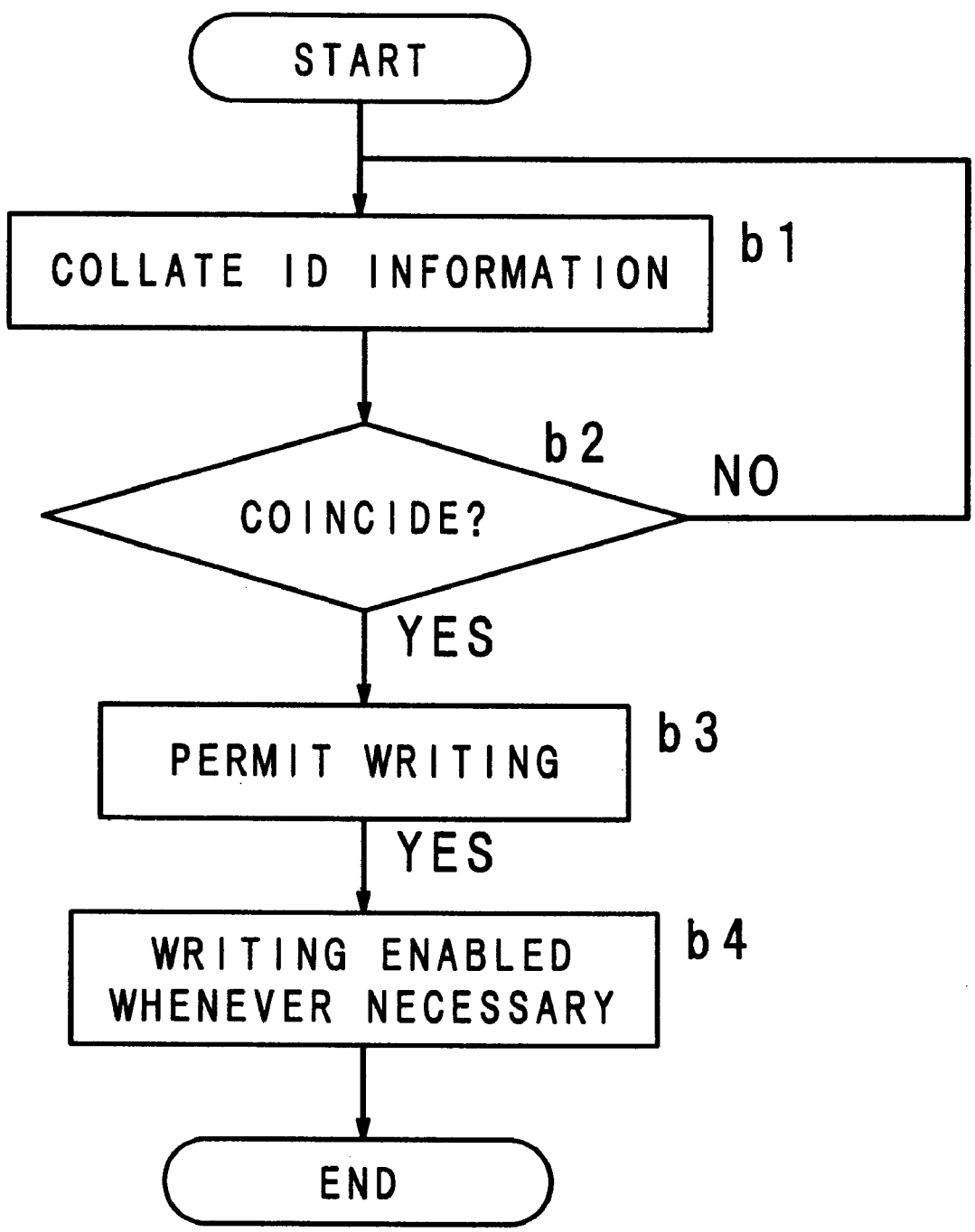
FIG. 7 is a flowchart of assistance in explaining a processing to perform writing to the flash ROM 33.

FIG. 7 is a flowchart of assistance in explaining a processing to perform writing to the flash ROM 33. When writing is performed to the flash ROM 33, the user inputs the user ID information. The user ID information input is stored in the ID reference register 43 through the data bus 13. At step b1, the user ID information is stored in the ID reference register 43. The comparing circuit 44 collates the user ID information with the manufacturer ID information stored in the ID storing register 42.

At step b2, based on the result of the collation at step b1, it is determined whether the user ID information and the manufacturer ID information coincide with each other. When the user ID information and the manufacturer ID information coincide with each other, the process proceeds to step b3. At step b3, the coincidence detection signal SA is supplied from the comparing circuit 44 to the data protecting circuit 45 to permit the writing to the flash memory cell 41.

At step b4, the data protecting circuit 45 is being supplied with the coincidence detection signal SA and when the writing signal WR is supplied from the CPU 2, the write enabling signal WRA is supplied to the flash memory cell 41 to enable the writing to the flash memory cell 41.

As described above, according to this embodiment, since data cannot be written to the flash memory cell 41 unless data is input which is the same as the manufacturer ID information stored in the ID storing register 42, the contents in the flash memory cell 41 is prevented from being inadvertently rewritten.

As the embodiment of the invention, the nonvolatile memory includes:

a register in which a protection code has been stored during manufacturing;

input means to which data is input when the memory contents are changed; and comparing protection means for comparing the data input to the input means and the protection code stored in the register, and for permitting the memory contents to be changed only when the data and the protection code coincide with each other.

According to the invention, when the contents in the electrically rewritable nonvolatile memory are changed, the comparing protection means determines whether or not the data input from the input means and the protection code stored in the register coincide with each other, and only when the data and the protection code coincide with each other, writing is permitted and the memory contents are rewritten. Thus, since the contents in the nonvolatile memory can be changed only when data the same as the protection code can be input from the input means, the contents in the nonvolatile memory are prevented from being inadvertently rewritten.

That is, according to the invention, when the contents in the nonvolatile memory are changed, since the comparing protection means determines whether or not the data input from the input means and the protection code stored in the register coincide with each other and permits writing only when the data and the protection code coincide with each other, the contents in the nonvolatile memory can be changed only when data the same as the protection code can be input from the input means, so that the memory contents are prevented from being inadvertently rewritten.

According to the embodiment of the invention, in an electrically rewritable semiconductor nonvolatile memory, a nonvolatile semiconductor memory is used which comprises:

a register in which a protection code is stored during manufacturing;

input means to which data is input when the memory contents are changed; and comparing protection means for comparing the data input to the input means and the protection code stored in the register, the comparing protection means permitting the memory contents to be changed only when the data and the protection code coincide with each other.

According to the invention, when the contents in the electrically rewritable semiconductor nonvolatile memory are changed, the comparing protection means determines whether or not the data input from the input means and the protection code stored in the register coincide with each other, and only when the data and the protection code coincide with each other, writing is permitted and the memory contents are rewritten. Thus, since the contents in the nonvolatile semiconductor memory can be changed only when data equivalent to the protection code is inputted from the input means, the contents in the nonvolatile semiconductor memory are prevented from being inadvertently rewritten.

That is, according to the invention, when the contents in the nonvolatile semiconductor memory are changed, since the comparing protection means determines whether or not the data input from the input means and the protection code stored in the register coincide with each other and permits writing only when the data and the protection code coincide with each other, the contents in the nonvolatile semiconductor memory can be changed only when data the same as the protection code can be input from the input means, so that the memory contents are prevented from being inadvertently rewritten.

Figure 8:
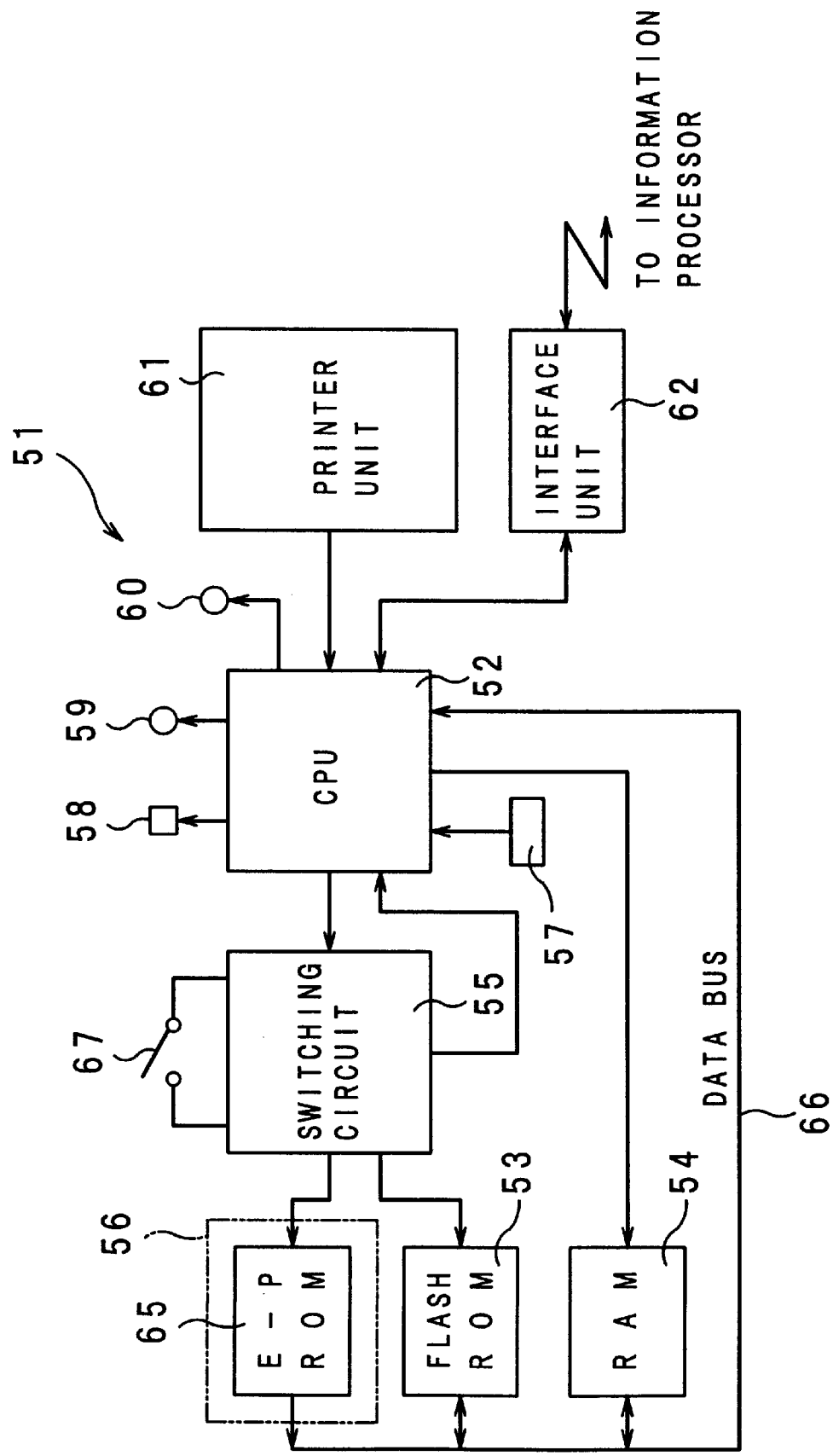
FIG. 8 is a block diagram showing the electrical structure of a microcomputer apparatus 51 according to a third embodiment of the invention.

FIG. 8 is a block diagram showing the electrical structure of a microcomputer apparatus 51 according to a third embodiment of the invention. The microcomputer apparatus 51 is provided in a printer apparatus similar to the remote printer 1 of the first and second embodiments. The printer apparatus is generally used as an external printer of an information processor such as a personal computer, and performs processing and printing of commands and data transmitted from the information processor through an external interface. For the printer apparatus provided with the microcomputer 51 according to this embodiment, the communication rate and the communication data format can be set in accordance with the information processor to which the printer apparatus is connected, and the processing programs can be rewritten and changed.

The microcomputer apparatus 51 comprises a CPU 52, a flash ROM 53, a RAM 54, a switching circuit 55, an attachment unit 56, a setting switch 57, a key device 58, a light emitting diode (hereinafter, referred to as LED) unit 59, a buzzer 60, a printer unit 61 and an interface unit 62.

The flash ROM 53 is a readable/rewritable nonvolatile memory controlled by the CPU 52 of the microcomputer 51. When the microcomputer apparatus 51 is off, it is unnecessary to supply power for maintaining the memory contents in the flash ROM 53. The flash ROM 53 is capable of being electrically rewritten in blocks of, for example, 64K bytes and has a data bus width of 16 bits.

The RAM 54 is a readable/rewritable volatile memory controlled by the CPU 52. When the microcomputer apparatus 51 is off, power for memory contents backup is supplied from a battery. The RAM 54 has a data bus width of 16 bits. The battery is not shown in the figure.

The attachment unit 56 comprises a socket to which an EPROM 65 is detachably attachable. The EPROM 65 is attached to the socket in second and third modes where a subsequently-described rewriting of the flash ROM 53 is performed. In a first mode where a subsequently-described normal operation is performed, the EPROM 65 is not attached.

The EPROM 65 is a read-only nonvolatile memory in the microcomputer apparatus 51 and has a data bus width of 8 bits. The EPROM 65 is attached to the attachment unit 56 in the second and third modes. The width of a data bus 66 of the microcomputer apparatus 51 is 16 bits. When the EPROM 65 having a data bus width of 8 bits is attached to the attachment unit 56, only lower-order 8 bits are connected to the data terminals of the EPROM 65 and the remaining upper-order bits are not connected.

To the switching circuit 55, a change-over switch 67 is connected. The switching circuit 55 is controlled by the change-over switch 67 and the CPU 52 and supplies a signal to the flash ROM 53 and the EPROM 65 attached to the attachment unit 56. The change-over switch 67 is a switch whose data bus width is selectable. The switching circuit 55 outputs a signal to the CPU 52 in response to an operation of the change-over switch 67.

The setting switch 57 is a switch for making initial settings such as the communication rate and the communication data format for communication with a non-illustrated information processor, and for setting a subsequently-described error printing mode in the second and third modes.

The key device 58 comprises three push switches. A J key is a key pushed for conveying a non-illustrated journal sheet provided in the printer unit 61. An R key is a key pushed for conveying a non-illustrated receipt sheet provided in the printer unit 11. When an on key is turned on by being pushed, communication is performed with the information processor, and when the on key is not pushed and is therefore off, communication is not performed with the information processor. When the microcomputer 51 is initialized after the subsequently-described rewriting of the flash ROM 53 has been completed, the J key and the R key are simultaneously pushed.

The LED unit 59 comprises three LEDs. A P-LED is turned on when power is supplied from the power source by a non-illustrated power switch, and is turned off when no power is supplied. An ON-LED is turned on when the microcomputer apparatus 51 is connected to the line of communication with the information processor through the interface unit 62, and is turned off when the microcomputer apparatus 51 is not connected. The ON-LED blinks when erasing, writing and collation of the contents in the flash ROM 53 are performed. An E-LED is turned on when a rewriting error occurs in rewriting the program stored in the flash ROM 53.

The buzzer 60 sounds differently between when rewriting of the flash ROM 53 normally ends and when abnormality occurs in the rewriting. The printer unit 61 performs printing when the microcomputer apparatus 51 is tested, when the initial settings are made and when data is received after communication with the information processor. The interface unit 62 is realized, for example, in the interface format of the RS-232C, and exchanges data with the information processor.

Figures 9, 10:
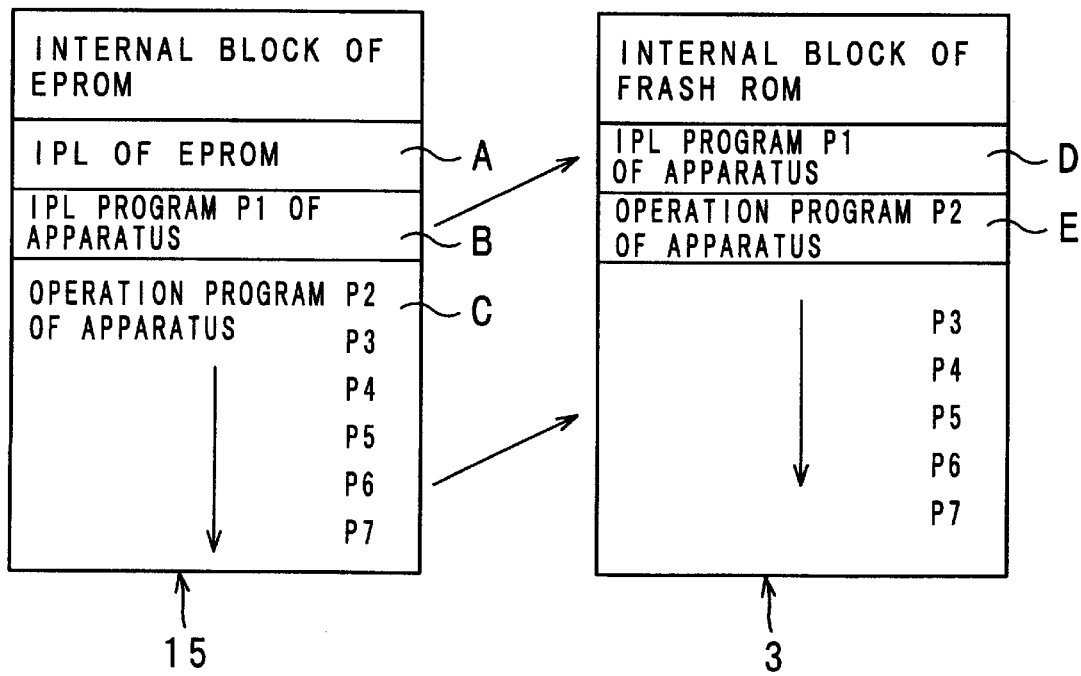
FIG. 9 shows a condition where the memory space of a CPU 52 of FIG. 8 is changed for each mode.
FIG. 10 shows address mapping changing conditions of an EPROM 65 and a flash ROM 53 of FIG. 8.

FIG. 9 shows the arrangement of memory space of the CPU 52. The CPU 52 controls the entire microcomputer apparatus 51 based on the program or data stored in a memory such as the flash ROM 53, the RAM 54 or the EPROM 65.

The arrangement of memory space of the CPU 52 differs between the first mode in which the normal operation is performed and the second and third modes in which the flash ROM 53 is rewritten.

The first mode is set in the normal condition, i.e. when the program and data in the flash ROM 53 are stored without any abnormality. In the first mode, the program stored in the flash ROM 53 is read out and executed by the CPU 52, so that, for example, data from the information processor received through the interface unit 62 are printed by the printer unit 61. In the second mode, the flash ROM 53 is initialized and the entire memory area is rewritten. In the third mode, the contents in the flash ROM 53 and the contents in the EPROM 65 are collated and only blocks of the flash ROM 53 where there is abnormality in the memory contents are rewritten.

In the memory space of the CPU 52, as shown in FIG. 9, the address space that can be accessed by the CPU 52 is divided into, for example, eight 2M-byte areas 0 to 7. With respect to the memory space of the CPU 52, in the first mode in the normal condition, the area 0 is used for the flash ROM 53, the area 2 is used for the RAM 4, the area 3 is used for the setting switch 57 and another input/output (I/O). The areas 1 and 4 are used for an extension such as a character generator read only memory (CG-ROM). Areas 5, 6 and 7 are unused. In the second and third modes, the area 0 is used for the EPROM 65 and the area 5 is used for the flash ROM 53. The other areas will not be described since they have the same arrangements as those in the first mode.

The CPU 52 performs control by reading out a program based on a specified area of the memory space. The specification of an area of the memory space is made by a select signal produced by decoding the higher-order bits of the address output by the CPU 52. For example, it is assumed that the specified area of the memory space is the area 2 in the first mode. In this case, the select signal produced based on the higher-order bits of the address output by the CPU 52 is supplied so as to select the RAM 54 of the area 2. To the RAM 4, the remaining lower-order bits are supplied and the data stored in the RAM 54 are output through the data bus 66. Immediately after the microcomputer apparatus 51 is turned on, i.e. when power supply to the microcomputer apparatus 51 is started, the area 0 of the memory space is always specified.

FIG. 10 shows the arrangements of memory conditions of the EPROM 65 and the flash ROM 53. In the EPROM 65, an IPL which is the initial program loader of the EPROM 65 is stored in a memory area A, an IPL program P1 of the microcomputer apparatus 51 is stored in a memory area B, and an operation program P2 of the microcomputer apparatus 51 is stored in a memory area C. Operation programs P3 to P7 of the apparatus 51 are succeedingly stored in the memory area C where the operation program P2 of the microcomputer 51 is stored. The IPL of the EPROM 65 is read in and executed by the CPU 52 in the second and third modes. By the IPL being executed by the CPU 52, the contents in the flash ROM 53 are rewritten. The IPL program P1 of the microcomputer apparatus 51 is a program for initializing the microcomputer apparatus 51. The operation programs P2 to P7 of the microcomputer apparatus 51 are programs for controlling the microcomputer apparatus 51.

Figure 11:
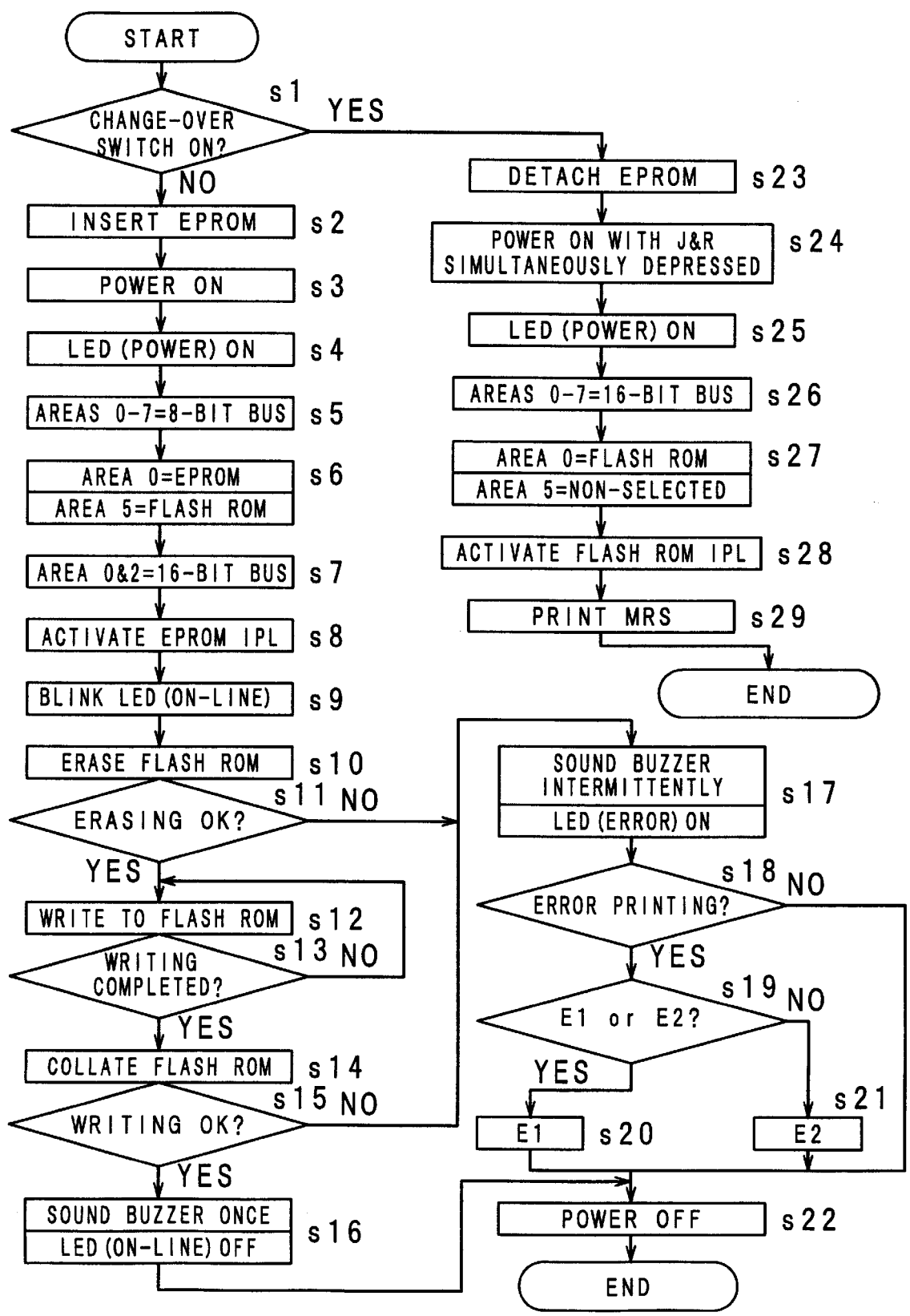
FIG. 11 is a flowchart showing an operation of the microcomputer apparatus 51 of FIG. 8.

In the flash ROM 53, the IPL program P1 of the microcomputer apparatus 51 is stored in a memory area D and the operation program P2 of the microcomputer apparatus 51 is stored in a memory area E. The operation programs P3 to P7 are succeedingly stored in the memory area E where the operation program P2 of the microcomputer 51 is stored. FIG. 11 is a flowchart showing an operation of the microcomputer apparatus 51. Using this flowchart, the second mode will be described below. At step s1, it is determined whether the change-over switch 67 provided in the switching circuit 55 is on or off. When the change-over switch 67 is on, the process proceeds to step s23. When the change-over switch 67 is off, the process proceeds to step s2.

At step s2, the EPROM 65 is inserted into the attachment unit 56. At step s3, power is supplied to the entire apparatus by the power switch provided in the microcomputer apparatus 51. At step s4, by the power being supplied, the P-LED of the LED unit 59 is turned on and the switching circuit 55 is activated which is subsequently described and shown in FIG. 12.

At step s5, the data bus widths for all the areas 0 to 7 of the memory space of the CPU 52 are hardware-set at 8 bits based on a signal supplied from the switching circuit 55 to the CPU 52. At step s6, the switching circuit 55 sets the area 0 of memory space of the CPU 52 to be used for the EPROM 65 and sets the area 5 to be used for the flash ROM 53 as shown in FIG. 9.

At step s7, the IPL of the EPROM 65 is executed by the CPU 52 and the data bus widths of the areas 2 and 5 of memory space of the CPU 52 are re-set. With respect to the RAM 54 in the area 2 of memory space of the CPU 52 and the flash ROM 53 in the area 5, the data bus widths are software-changed from 8 bits to 16 bits by executing the IPL program of the EPROM 65. Thus, the data bus width for the area 0 of memory space of the CPU 52 is 8 bits and the data bus widths for the areas 2 and 5 are set at 16 bits.

At step s8, the IPL program of the EPROM 65 is further executed by the CPU 52. At step s9, the O-LED of the LED unit 59 blinks to thereby inform the operator that erasing of the flash ROM 53, writing and collation are started.

At step s10, by the IPL program of the EPROM 65 being executed by the CPU 52, the data stored in the memory area of the flash ROM 53 are all erased. At step s11, it is checked whether the erasing of the flash ROM 53 has correctly been performed or not. When the erasing has correctly been performed, the process proceeds to step s12. When the erasing has not correctly been performed, the process proceeds to step s17.

At step s12, the IPL program P1 of the microcomputer apparatus 51 stored in the EPROM 65 and the operation programs P2 to P7 of the microcomputer apparatus 51 are written into the flash ROM 53 in order. In the writing to the flash ROM 53 and subsequently-described collation, 8-bit data from the EPROM 65 are consecutively read out twice, and read into and stored in an internal register of the CPU 52 through the data bus 66 for the lower-order 8 bits. The data of a total of 16 bits being stored is stored in the flash ROM 53 through the data bus 66, so that, as shown in FIG. 10, the IPL program P1 of the microcomputer apparatus 51 stored in the memory area B of the EPROM 65 is stored in the memory area D of the flash ROM 53. The operation program P2 of the microcomputer apparatus 51 stored in the memory area C of the EPROM 65 is stored in the memory area E of the flash ROM 53 and the other operation programs P3 to P7 are stored likewise.

At step s13, it is determined whether the data writing to the flash ROM 53 has been completed or not. When the data writing has been completed, the process proceeds to step s14. When the data writing has not been completed, the process returns to step s12.

At step s14, the contents in the EPROM 65 and the contents written to the flash ROM 53 are collated. In this collation, a processing similar to that performed in writing data into the flash ROM 53 is performed. That is, the two 8-bit data consecutively read out from the EPROM 65 twice are stored into the internal register of the CPU 2, and compared with the 16-bit data read out from the flash ROM 53. The collation between the flash ROM 53 and the EPROM 65 is performed by successively comparing the data in the flash ROM 53 and the data in the EPROM 65 in 16 bits.

At step s15, based on the result of the collation, it is checked whether the programs have correctly been written to the flash ROM 53 or not. When the writing has correctly been performed without any abnormality, the process proceeds to step s16. When the writing has not correctly been performed, the process proceeds to step s17.

At step s16, the buzzer 60 is sounded once and the O-LED of the LED unit 59 is turned off to thereby inform the operator that the programs have correctly been written from the EPROM 65 to the flash ROM 53.

At step a17, the buzzer 60 is sounded at regular intervals and the E-LED of the LED unit 59 is turned on. At step s18, whether error printing is performed or not is determined based on the setting of the setting switch 57. When the performance of the error printing is set by the setting switch 57, the process proceeds to step s19. For the error printing, for example, two modes E1 and E2 are prepared. When the performance of the error printing is not set, the process proceeds to step s22, where the error printing is not performed and only by the turning on of the E-LED, the operator is informed that abnormality occurs in the writing to the flash ROM 53.

At step s19, it is determined whether the set error printing mode is the error printing mode E1 or not. When the set mode is the error printing mode E1, the process proceeds to step s20. When the set mode is not the error printing mode E1, i.e. when the set mode is the error printing mode E2, the process proceeds to step s21.

Figure 12:
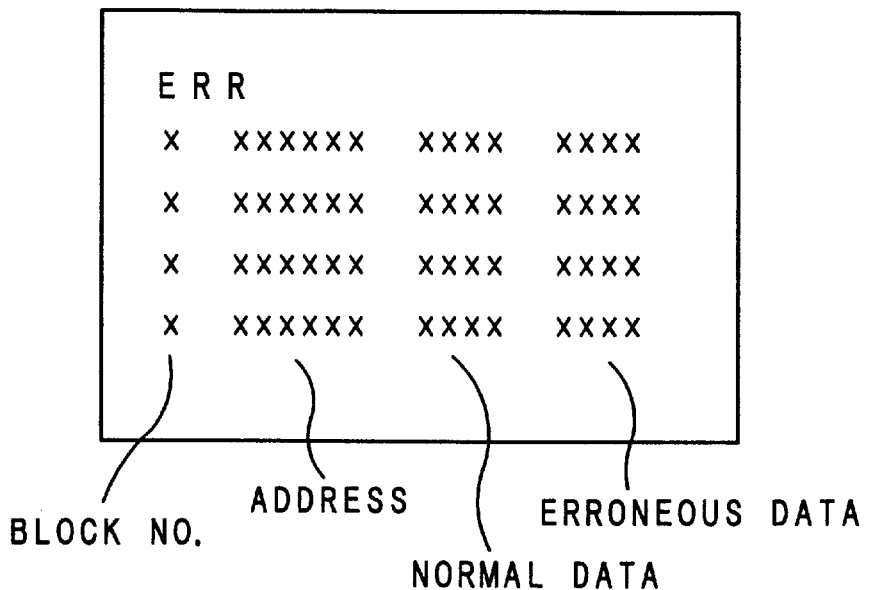
FIG. 12 shows an example of erroneous data printed in an error printing mode E1 at step s20 of FIG. 11.

FIG. 12 shows an example of erroneous data printed in the error printing mode E1. At step s20, the printer unit 61 performs printing based on the error printing mode E1. In the error printing mode E1, based on the result of the collation between the EPROM 65 and the flash ROM 53 performed at step s14, only erroneous data are printed by the printer unit 61. As shown in FIG. 12, the data to be printed are block numbers, addresses, normal data which are data in the EPROM 65, and erroneous data. Thus, since not only the E-LED is turned on but also the erroneous data are printed when the writing to the flash ROM 53 is not performed normally but ends abnormally, the operator of the microcomputer 51 can check the location of abnormality and can handle the abnormality appropriately.

Figure 13:
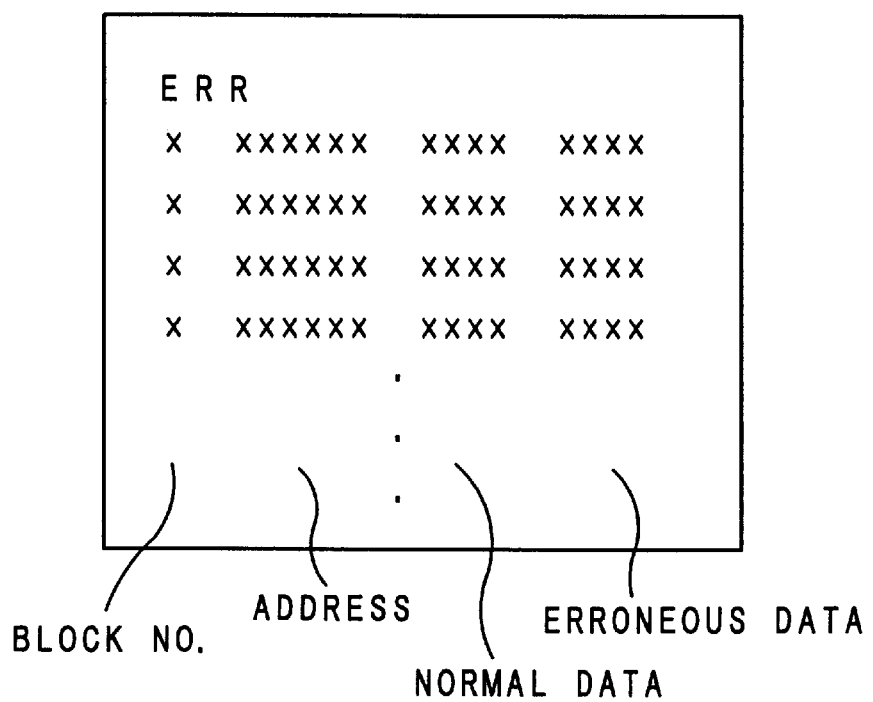
FIG. 13 shows an example of erroneous data printed in an error printing mode E2 at step s21 of FIG. 11.

FIG. 13 shows an example of erroneous data printed in the error printing mode E2. At step s21, the printer unit 61 performs printing based on the error printing mode E2. In the error printing mode E2, based on the result of the collation between the EPROM 65 and the flash ROM 53 performed at step s14, data in erroneous blocks are printed by the printer unit 61. Therefore, in substance, data not being erroneous are also printed. As shown in FIG. 13, the data to be printed are block numbers, addresses, normal data which are data of the EPROM 65, and erroneous data.

Thus, since not only the E-LED is turned on but also the data in the erroneous blocks are printed when the writing to the flash ROM 53 is not performed normally but ends abnormally, the operator of the microcomputer 51 can check the location of abnormality and can handle the abnormality appropriately. Further, since not only the erroneous data can be checked but also the data can be checked in blocks, the erroneous data can be located in the blocks.

At step s22, the power supply from the power source to the microcomputer apparatus 51 is stopped. After the writing to the flash ROM was normally performed as step s16, the power supply is stopped as described later and then, the change-over switch 67 is turned on and the EPROM 65 is detached from the attachment unit 56. When the writing to the flash ROM 53 ended abnormally, a processing for the abnormal end is performed before or after the power supply is stopped.

Hereinafter, a processing will be described which is performed after the writing to the flash ROM 53 was performed normally. When the change-over switch 67 is operated to be on, the process proceeds from step s1 to step s23. At step s23, the EPROM 65 attached to the attachment unit 56 is detached.

At step s24, the power switch of the microcomputer apparatus 51 is operated with the J key and the R key being simultaneously depressed, so that the power is supplied to the microcomputer apparatus 51. At step s25, the P-LED of the LED unit 59 is turned on and the switching circuit 55 is activated. At step s26, based on a signal supplied from the switching circuit 55 to a mode terminal of the CPU 52, the data bus widths of all the areas of memory space of the CPU 52 are set at 16 bits.

At step s27, as shown in FIG. 9, the area 0 of memory space of the CPU 52 is set to be used for the flash ROM 53 and the area 5 is set to be unused and non-selected. At step s28, the IPL program P1 of the apparatus 51 stored in the flash ROM 53 is read out and executed by the CPU 52. Then, the operation programs P2 to P7 of the microcomputer apparatus 51 are successively read out and executed by the CPU 52 for making the initial settings of the microcomputer apparatus 51. After the initial settings of the microcomputer apparatus 51 are made, the printer unit 61 prints "MASTER RESET" to thereby inform the operator that the initial settings of the microcomputer apparatus 51 are completed.

Figure 14:
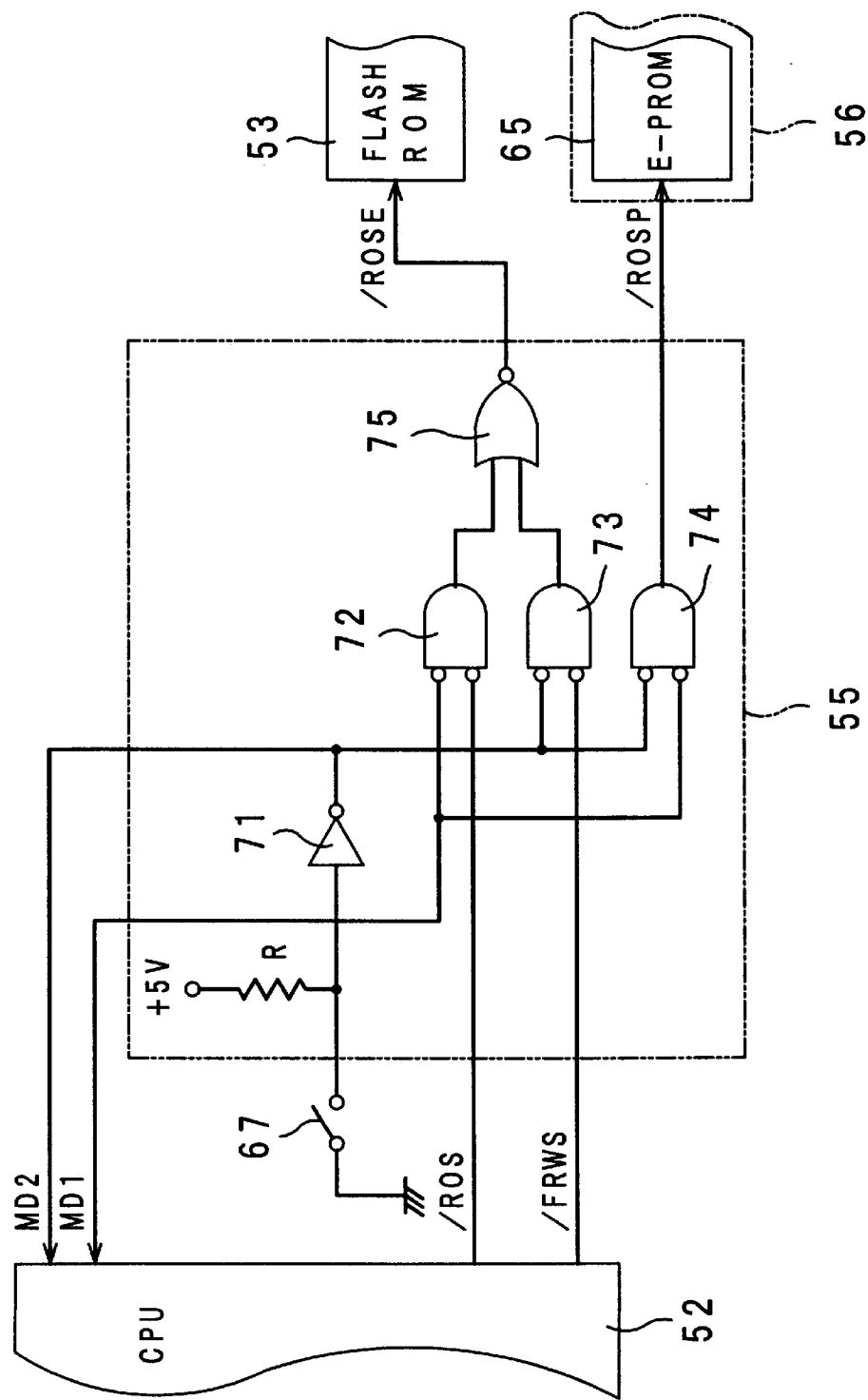
FIG. 14 is a block diagram showing the inner electrical structure of the switching circuit 55 of FIG. 8.

FIG. 14 is a block diagram showing the inner electrical structure of the switching circuit 55. The switching circuit 55 comprises a resistor R, an inverter circuit 71, AND circuits 72 and 73 which are substantially NOR circuits whose inputs are inverted, a NAND circuit 74 whose input is inverted, and a NOR circuit 75. To the switching circuit 55, the change-over switch 67 is connected as mentioned previously. By an operation of the change-over switch 67, it is determined whether an operation of the first mode or an operation of the second or the third mode is performed. "/" in "/ROS", "/FRWS ", "/ROSF" and "/ROSP" represents a signal which becomes active at low level.

In TABLES 1 and 2, description will be given by using the reference designations of the terminals and circuits. For the change-over switch 67, the switching conditions are shown. For mode terminals MD1 and MD2, the levels of the input signals are shown. In TABLE 1, the high level is represented as 'H', and the low level, as 'L.' The numeral (71) in TABLE 1 represents the output of the inverter circuit 71.

TABLE 1

| Change-over switch | MD1 | MD2 (71) |
| --- | --- | --- |
| ON | L | H |
| OFF | H | L |

As shown in the second line of TABLE 1, when the power switch of the microcomputer apparatus 51 is operated with the change-over switch 67 being on, power is supplied from the power source to the microcomputer apparatus 51. When power is supplied, a voltage of 5 volts is applied to one end of the resistor R of the switching circuit 55. Since the change-over switch 67 connected to the other end of the resistor R is on, a low-level signal is supplied to the mode terminal MD1 of the CPU 52 and to the inverter circuit 71. A high-level signal output from the inverter circuit 71 is supplied to the mode terminal MD2 of the CPU 52. Consequently, the data bus widths of all the areas 0 to 7 of memory space of the CPU 52 are set at 16 bits and the operation of the first mode is performed in the microcomputer apparatus 51.

As shown in the third line of TABLE 1, when the power switch of the microcomputer apparatus 51 is operated with the change-over switch 67 being off, power is supplied from the power source to the microcomputer apparatus 51. When the power is supplied, a voltage of 5 volts is applied to one end of the resistor R of the switching circuit 55. Since the change-over switch 67 connected to the other end of the resistor R is open, a high-level signal is supplied to the inverter circuit 71. A low-level signal output from the inverter circuit 71 is supplied to the mode terminal MD2 of the CPU 52. Consequently, the data bus widths of all the areas 0 to 7 of memory space of the CPU 52 are set at 8 bits and the operation in the second or the third mode is performed in the microcomputer apparatus 51.

TABLE 2 shows a relationship among the signal levels of a first select signal /ROS specifying the area 0 of the memory space and a second select signal /FRWS specifying the area 5 output from the CPU 2, the AND circuits 72, 73, and the signal levels of a first chip select signal /ROSP and a second chip select signal /ROSF. In TABLE 2, the high level is represented by 'H' and the low level is represented by 'L.'

TABLE 2

| Change-over switch | /ROS | /FRWS | 72 | 73/ | /ROSP | /ROSF |
|---|---|---|---|---|---|---|
| OFF | L | H | L | L | L | H |
|  | H | L | L | H | H | L |
| ON | L | H | H | L | H | L |
|  | H | L | L | L | H | H |

As shown in the second line of TABLE 2, when the signal levels shown in the third line of TABLE 1 are supplied to the mode terminals MD1 and MD2 with the change-over switch 67 being off, i.e. in the second and third modes, the CPU 52 outputs the first select signal /ROS being low and specifying the area 0 of the memory space and the second select signal /FRWS being high and not specifying the area 5.

To one input terminal of the AND circuit 72, the high-level signal supplied to the inverter circuit 71 is supplied being inverted. To the other input terminal of the AND circuit 72, the first select signal /ROS is supplied being inverted. Consequently, the AND circuit 72 outputs a low-level signal to one input terminal of the NOR circuit 75.

To one input terminal of the AND circuit 73, the low-level signal output from the inverter circuit 71 is supplied being inverted. To the other input terminal of the AND circuit 73, the second select signal /FRWS is supplied being inverted. Consequently, the AND circuit 73 outputs a low-level signal to the other input terminal of the NOR circuit 75.

To one input terminal of the NOR circuit 75, the output from the AND circuit 72 is supplied. To the other input terminal of the NOR circuit 75, the output from the AND circuit 73 is supplied. Since these outputs are both low, the NOR circuit 75 outputs the second chip select signal /ROSF being high to the flash ROM 53.

To one input terminal of the NAND circuit 74, the low-level signal output from the inverter circuit 71 is supplied being inverted. To the other terminal of the NAND circuit 74, the first select signal /ROS is supplied being inverted. Consequently, the NAND circuit 74 outputs the first chip select signal /ROSP being low to the EPROM 65, so that the EPROM 65 is selected also for the area 0 of the memory space. With respect to the third to fifth lines of TABLE 2, the switching circuit 55 performs operations similar to that described with respect to the second line of TABLE 2. Therefore, the operations of the switching circuit 55 for the third to fifth lines of TABLE 2 will not be described in detail.

As shown in the third line of TABLE 2, when the change-over switch 67 is off, i.e. in the second and third modes, the CPU 52 outputs the first select signal /ROS being high and not specifying the area 0 of the memory space and the second select signal /FRWS being low and specifying the area 5. Consequently, the first chip select signal /ROSP being high is output to the EPROM 65 and the second chip select signal /ROSF being low is output to the flash ROM 53. For the area 5 of the memory space, the flash ROM 53 is selected.

As shown in the fourth line of TABLE 2, when the change-over switch 67 is on, i.e. in the first mode, the CPU 52 outputs the first select signal /ROS being low and specifying the area 0 of the memory space and the second select signal /FRWS being high and not specifying the area 5. Consequently, the first chip select signal /ROSP being high is output to the EPROM 65 and the second chip select signal /ROSF being low is output to the flash ROM 53. For the area 0 of the memory space, the flash ROM 53 is selected.

As shown in the fifth line of TABLE 2, when the change-over switch 67 is on, i.e. in the first mode, the CPU 52 outputs the first select signal /ROS being high and not specifying the area 0 of the memory space and the second select signal /FRWS being low and specifying the area 5. Consequently, the first chip select signal /ROSP being high is output to the EPROM 65 and the second chip select signal /ROSF being high is output to the flash ROM 53. The area 5 of the memory space is set to be unused.

Figure 15:
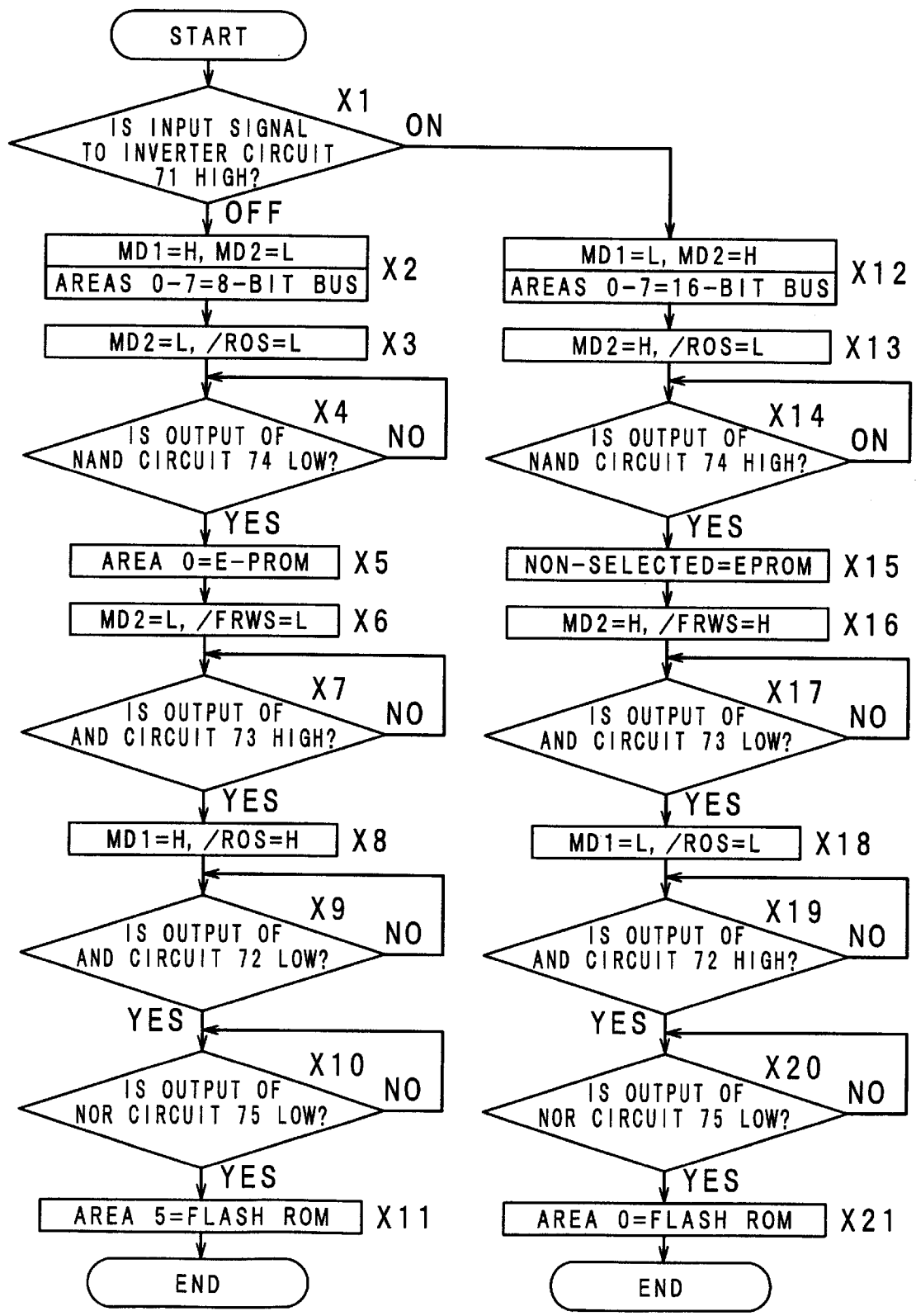
FIG. 15 is a flowchart of assistance in explaining an operation of the switching circuit 55 of FIG. 14.

FIG. 15 is a flowchart of assistance in explaining an operation of the switching circuit 55. At step x1, it is determined whether the signal supplied to the inverter circuit 71 is high or not. When the signal is high, the process proceeds to step x1. When the signal is low, the process proceeds to step x12.

At step x2, a high-level signal is supplied to the mode terminal MD1 of the CPU 52 and a low-level signal is supplied to the mode terminal MD2. Consequently, all the areas 0 to 7 of memory space of the CPU 52 are set at 8 bits and an operation of either the second or the third mode is performed.

At step x3, the power of the microcomputer apparatus 51 is turned on. Since this is the time of start of the power supply to the microcomputer apparatus 51, the first select signal /ROS is output which is low and specifies the area 0 of memory space of the CPU 52.

At step x4, it is determined whether the output of the NAND circuit 74 is low or not. When the output is low, the process proceeds to step x5. When the output is high, the process returns to stepx4 and waits at step x4 until the output becomes low. At step x5, the first chip select signal /ROSP being low is supplied to the EPROM 65, and as shown in FIG. 9, the area 0 of memory space of the CPU 52 is allocated to the EPROM 65. The CPU 52 reads out and executes the IPL of the EPROM 65 to rewrite the flash ROM 53.

At step x6, the second select signal /FRWS is output which is low and specifies the area 5 of memory space of the CPU 52. To the two input terminals of the AND circuit 73, the signal supplied to the mode terminal MD2 and the second select signal /FRWS are supplied. At step x7, it is determined whether the output of the AND circuit 73 is high or not. When the output is high, the process proceeds to step x8. When the output is low, the process returns to step x7 and waits at step x7 until the output becomes high.

At step x8, the first select signal /ROS is output which is high and does not specify the area 0 of memory space of the CPU 52. To the two input terminals of the AND circuit72, the signal supplied to the mode terminal MD1 and the first select signal /ROS are supplied. At step x9, it is determined whether the output of the AND circuit 72 is low or not. When the output is low, the process proceeds to step x10. When the output is high, the process returns to step x9 and waits at step x9 until the output becomes high.

At step x10, it is determined whether the output of the NOR circuit 75 is low or not. When the output is low, the process proceeds to step x11. When the output is high, the process returns to step x10 and waits at step x10 until the output becomes high. At step x11, the second chip select signal /ROSF being low is supplied to the flash ROM 53, and as shown in FIG. 9, the flash ROM 53 is allocated to the area 5 of memory space of the CPU 52.

At step x12, a low-level signal is supplied to the mode terminal MD1 of the CPU 52 and a high-level signal is supplied to the mode terminal MD2. Consequently, all the areas 0 to 7 of memory space of the CPU 52 are set at 16 bits and the operation of the first mode is performed.

At step x13, the power of the microcomputer apparatus 51 is turned on. Since this is the time of start of the power supply to the microcomputer apparatus 51, the first select signal IROS is output which is low and specifies the area 0 of memory space of the CPU 52.

At step x14, it is determined whether the output of the NAND circuit 74 is high or not. When the output is high, the process proceeds to step x15. When the output is low, the process returns to step x14 and waits at step x14 until the output becomes low. At step x15, the first chip select signal /ROSP being high is supplied to the EPROM 65, and as shown in FIG. 9, the EPROM 65 is not allocated to the area 0 of memory space of the CPU 52.

At step x16, the second select signal /FRWS is output which is high and does not specify the area 5 of memory space of the CPU 52. To the two input terminals of the AND circuit 73, the signal supplied to the mode terminal MD2 and the second select signal /FRWS are supplied. At step x17, it is determined whether the output of the AND circuit 73 is low or not. When the output is low, the process proceeds to step x18. When the output is high, the process returns to step x17 and waits at step x17 until the output becomes low.

At step x18, to the two input terminals of the AND circuit 72, the signal supplied to the mode terminal MD1 and the first select signal /ROS are supplied. At step x19, it is determined whether the output of the AND circuit 72 is high or not. When the output is high, the process proceeds to step x20. When the output is low, the process returns to step x19 and waits at step x19 until the output becomes high.

At step x20, it is determined whether the output of the NOR circuit 75 is low or not. When the output is low, the process proceeds to step x21. When the output is high, the process returns to step x20 and waits at step x20 until the output becomes high. At step x21, the second chip select signal /ROSF being low is supplied to the flash ROM 53, and as shown in FIG. 9, the flash ROM 53 is allocated to the area 0 of memory space of the CPU 52.

By the above-described operation of the switching circuit 55, in the second and third modes, the EPROM 65 is allocated to the area 0 of memory space of the CPU 52 and the flash ROM 53 is allocated to the area 5 of the memory space. In the first mode, the flash ROM 53 is allocated to the area 0 of memory space of the CPU 52. Thus, the rewriting of the flash ROM 53 is performed by a simple operation such that the EPROM 65 is attached to the attachment unit 56 and the change-over switch 67 is turned off.

Figure 16:
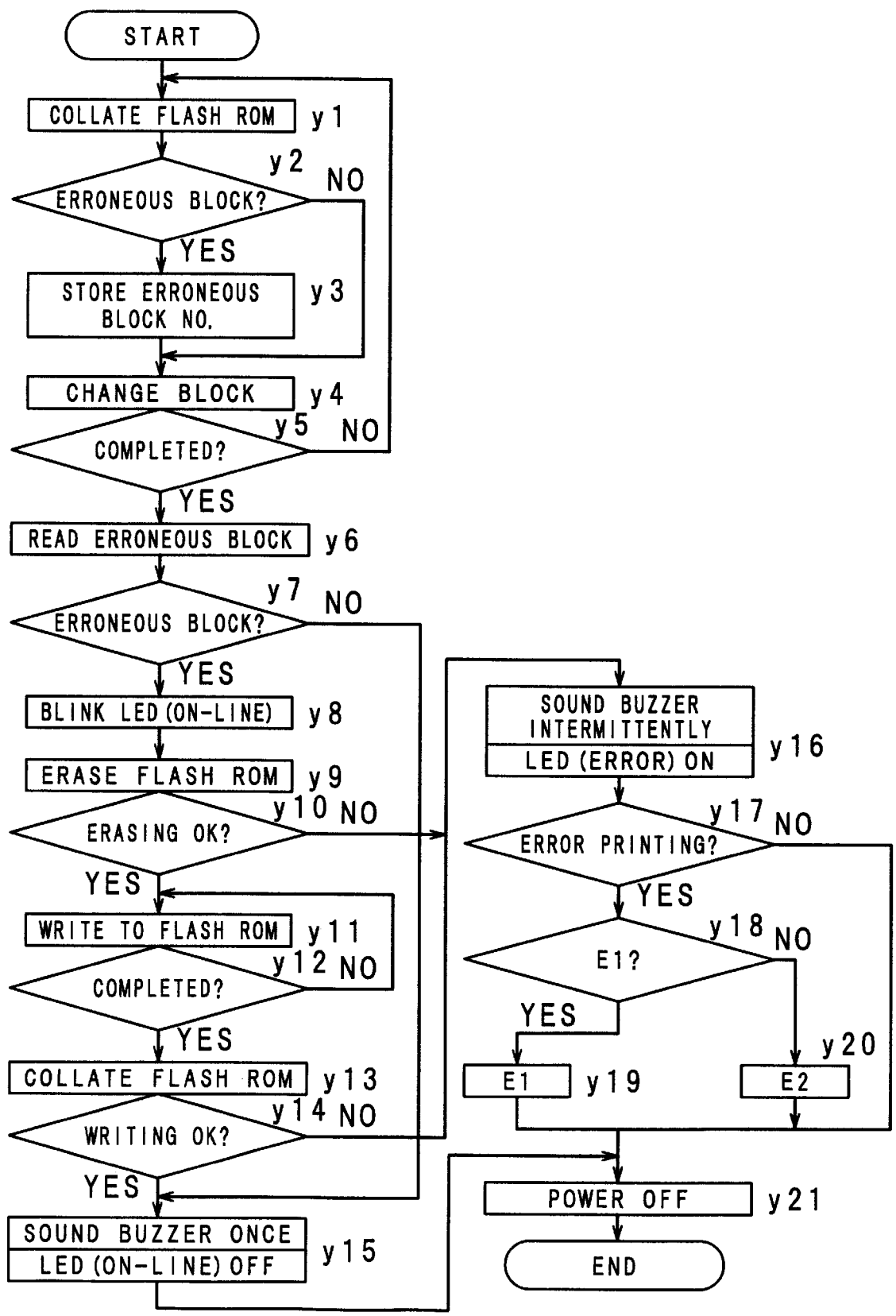
FIG. 16 is a flowchart showing an operation of the microcomputer apparatus 51 in the collation between the contents in the flash ROM 53 of FIG. 8 and the contents in the EPROM 65 and in the rewriting.

FIG. 16 is a flowchart showing an operation of the microcomputer apparatus 51 in the collation between the contents in the flash ROM 53 and the contents in the EPROM 65 and in the rewriting. The flowchart shown in FIG. 16 is for explaining an operation in the third mode to perform rewriting based on the result of the collation between the contents in the flash ROM 53 and the contents in the EPROM 65. As shown in FIG. 10, the case that the data stored in the flash ROM 53 are stored in seven blocks, i.e. memory areas, and the memory area where an abnormality is detected is the memory area E, i.e. the block number 2 is assummed.

At step y1, by the IPL of the EPROM 65 being executed by the CPU 52, the contents in the flash ROM 53 and the contents in the EPROM 65 are collated. The collation is performed in blocks of the flash ROM 53 so that the IPL program P1 of the microcomputer apparatus 51 in the memory area B of the EPROM 65 and the IPL program P1 in the memory area D of the flash ROM 53 are collated.

At step y2, it is determined whether or not the flash ROM 53 has a block in which abnormality is detected. When the flash ROM 53 has a block in which abnormality is detected, the process proceeds to step y3. When the flash ROM 53 does not have such a block, the process proceeds to step y4.

At step y3, the number of the block in which abnormality is detected is stored in the RAM 54. At step y4, the block for which the collation is performed is shifted to the next block. At step y5, it is determined whether the collation performed in blocks has been completed or not. When the collation has been completed, the process proceeds to step y6. When the collation has not been completed, the process returns to step y1. Consequently, in the RAM 54, the block number is stored as the block where abnormality is detected.

At step y6, the block number stored in the RAM 54 is read out. At step y7, it is determined whether or not there is a block in which abnormality is detected. When there is such a block, the process proceeds to step y8. When there is no such a block, the process proceeds to step y15.

At step y8, the O-LED of the LED unit 59 blinks. At step y9, the data in the block in which abnormality are detected is erased based on the block number of the flash ROM 53. At step y10, it is checked whether the erasing of the flash ROM 535 has correctly been performed or not. When the erasing has correctly been performed, the process proceeds to step y11. When the erasing has not correctly been performed, the process proceeds to step y16.

At step y11, the operation program P2 of the microcomputer apparatus 51 stored in the block in which abnormality is detected is read out from the memory area C of the EPROM 65 and written into the flash ROM 53 to rewrite the data in the block.

At step y12, it is determined whether the data writing to the flash ROM 53 has been completed or not. When the data writing has been completed, the process proceeds to step y13. When the data writing has not been completed, the process returns to step y11.

At step y13, the operation program P1 of the microcomputer apparatus 51 in the memory area C of the EPROM 65 is collated with the data written to and stored in the block of the flash ROM 53.

At step y14, based on the result of the collation, it is checked whether or not the operation program P1 of the microcomputer apparatus 51 has correctly been written to the block of the flash ROM 3. When the program P1 has correctly been written without any abnormality, the process proceeds to step y15. When the program P1 has not correctly been written, the process proceeds to step y16.

At step y15, the buzzer 60 is sounded once and the O-LED of the LED unit 59 is turned off to thereby inform the operator that the flash ROM 53 has no block in which abnormality is detected and that the writing from the EPROM 65 to the flash ROM 53 has correctly been performed without any abnormality.

At step y16, the buzzer 60 is sounded at regular intervals and the E-LED of the LED unit 59 is turned on. At step y17, whether error printing is performed or not is determined based on the setting of the setting switch 57. When the performance of the error printing is set by the setting switch 57, the process proceeds to step y18. When the performance of the error printing is not set, the process proceeds to step y21, where the error printing is not performed and only by the turning on of the E-LED, the operator is informed that abnormality occurs in the writing to the flash ROM 53.

At step y18, it is determined whether the set error printing mode is the error printing mode E1 or not. When the set mode is the error printing mode E1, the process proceeds to step y19. When the set mode is not the error printing E1, i.e. when the set mode is the error printing mode E2, the process proceeds to step y20.

At step y19, as shown in FIG. 12, printing is performed by the printer unit 61 based on the error printing mode E1. At step y20, as shown in FIG. 13, printing is performed by the printing unit 61 based on the error printing mode E2. At step y21, the power switch is turned off, so that the power supply from the power source to the microcomputer apparatus 51 is stopped.

As described above, the CPU 52 controls the operation of the microcomputer apparatus 51 so that only a block of the flash ROM 53 where abnormality is detected is rewritten. Since normal blocks are not rewritten, the contents in the flash ROM 53 are efficiently recovered. In addition, memories such as the flash ROM 53 that can be rewritten only a limited number of times are made more reliable.

As a fourth embodiment of the invention, at the interface unit 62 of FIG. 8, the IPL program P1 of the microcomputer apparatus 51 stored in the flash ROM 53 may be rewritten based on data transmitted from an external information processor. This embodiment will be described below.

The microcomputer apparatus 51 is set in a condition where communication with the information processor is possible, i.e. in an online mode. From the information processor connected to the interface unit 62, a command to rewrite the flash ROM 53, operation program data of the microcomputer apparatus 51 and a command to end the transmission of data for rewriting the flash ROM 53 are successively transmitted to the microcomputer apparatus 51 according to preset transmission and reception procedures.

In the microcomputer apparatus 51, the IPL program P1 of the microcomputer apparatus 51 in the flash ROM 53 is stored in the RAM 54 based on the command to rewrite the flash RAM 53 received from the information processor. When the program P1 is stored in the RAM 54, a command to rewrite the flash ROM 53 is executed which is included in the IPL program P1 of the microcomputer apparatus 51 stored in the RAM 54. Like in the third embodiment, the data temporarily stored in the RAM 54 are protected.

Based on data to specify a rewritten block of the flash ROM 53 included in the received data, the operation programs of the microcomputer apparatus 51 are successively written in to the flash ROM 53. When the command to end the transmission of data for rewriting the flash ROM 53 are received, the rewriting of the flash ROM 53 is ended. When the rewriting is ended, the initialization the same as that performed at power-on of the microcomputer apparatus 51 is performed by a software reset command and the microcomputer apparatus 51 is set in the online mode.

As described above, the third and fourth embodiments of the invention comprise switching means for switching operation so that during normal operation, the rewritable nonvolatile memory is disposed, within a memory space accessed by a central processing unit, in a memory area for initialization accessed by the central processing unit at the time of activation from a reset condition, and that during rewriting operation, the rewritable nonvolatile memory is disposed in a memory area different from the memory area for initialization and the nonvolatile memory element is disposed in the memory area for initialization.

According to the invention, during the normal operation, the rewritable nonvolatile memory is disposed in the memory area for initialization in the memory space of the central processing unit. When the microcomputer apparatus is activated from the reset condition, an execution program of the rewritable nonvolatile memory is executed. When abnormality occurs in the execution program written to the rewritable nonvolatile memory, the nonvolatile memory element is inserted into the connecting member. At this time, when the microcomputer apparatus is activated from the reset condition, the switching circuit disposes the nonvolatile memory element in the memory area for initialization in the memory space of the central processing unit. Consequently, an execution program stored in the nonvolatile memory element is transferred to the rewritable nonvolatile memory to perform the rewriting operation. Thus, since the nonvolatile memory may be rewritten with the switching circuit and the connecting member having simple structures compared to the interface and the connector necessary for the prior art, the scale of the circuit may be reduced.

That is, according to the invention, when the microcomputer apparatus is activated from the reset condition in the case where abnormality occurs in the execution program written to the rewritable nonvolatile memory, the switching circuit disposes the nonvolatile memory element in the memory area for initialization in the memory space of the central processing unit. Consequently, the nonvolatile memory is rewritten. Since the nonvolatile memory may be rewritten with the switching circuit and the connecting member having simple structures, the scale of the circuit may be reduced compared with the prior art using the interface and the connector.

Moreover, in the invention, the data bus width of the nonvolatile memory element is smaller than the data bus width of the central processing unit, and during the rewriting operation, the central processing unit switches the data bus width to be small when data stored in the nonvolatile memory element are read out from the nonvolatile memory element.

According to the invention, the nonvolatile memory element is connected by the connecting member, for example, to the lower-order bits of a data bus width of 16 bits, i.e. to a 8-bit data bus. During the rewriting operation, for example, the data bus width of 16 bits of the central processing unit is switched to be the same as the data bus width of 8 bits of the nonvolatile memory element and the data in the nonvolatile memory element are read out by the data bus of the lower-order bits of the central processing unit. Thus, since the nonvolatile memory may be rewritten by use of the nonvolatile memory element having a data bus width smaller than the data bus width of the central processing unit, the scale of the circuit may be reduced compared with the prior art using a memory having a data bus width the same as that of the central processing unit.

That is, according to the invention, during the rewriting operation, the data bus width of the central processing unit is switched to be the same as the data bus width of the nonvolatile memory element. Thus, since the nonvolatile memory may be rewritten by use of the nonvolatile memory element having a data bus width smaller than the data bus width of the central processing unit, the scale of the circuit may be reduced compared with the prior art using a memory having a data bus width the same as the data bus width of the central processing unit.

Moreover, the invention is characterized in that the abnormality detecting means detects for detecting an abnormality of the execution program in blocks of a predetermined size for the execution program stored in the rewritable nonvolatile memory is provided, and the controlling means controls so that the execution program is rewritten only for a block in which an abnormality of the execution program is detected by the abnormality detecting means.

According to the invention, the detecting means collates in predetermined blocks the execution program stored in the nonvolatile memory and the execution program stored in the nonvolatile memory element inserted in the connecting member to detect abnormality of the execution program stored in the nonvolatile memory. The controlling means reads out the execution program of the nonvolatile memory element for a block where the execution program is stored which has the abnormality detected by the abnormality detecting means, and rewrites only the block of the nonvolatile memory. Thus, since only the block in which abnormality is detected is rewritten for the nonvolatile memory that can be rewritten only a limited number of times, the durable period of the apparatus increases, so that the apparatus becomes more reliable.

That is, according to the invention, the abnormality detecting means detects abnormality of the execution program stored in the nonvolatile memory. Based on the result of the detection by the abnormality detecting means, the controlling means rewrites only the block of the nonvolatile memory where abnormality is detected. Thus, since only the block where abnormality is detected is rewritten for the nonvolatile memory that can be rewritten only a limited number of times, the durable period of the apparatus increases, so that the apparatus becomes more reliable.

Moreover, the abnormality detecting means of the invention includes data collation means for collating contents of the rewritable nonvolatile memory and contents of the nonvolatile memory element, collation result storing means, in response to an output of the data collation means, for storing a collation result, and collation result output means for outputting the collation result stored in the collation result storing means.

According to the invention, the data collation means collates the contents in the nonvolatile memory and the contents in the nonvolatile memory element to detect abnormality of the execution program stored in the nonvolatile memory. The collation result storing means stores the collation result by the data collation means such as the abnormal portion of the data stored in the nonvolatile memory. The collation result output means prints the collation result stored in the collation result storing means means, for example, with a printer unit to output. and outputs the collation result stored in the storing means, for example, to a printer unit. Since the operator is informed of the collation result such as an abnormal portion of the data, the operator may promptly and correctly handle the abnormality of execution program of the nonvolatile memory, so that the execution program may promptly and accurately be recovered from abnormality.

That is, according to the invention, since the operator is informed of the collation result such as the abnormal portion of the data, the operator may promptly and correctly handle the abnormality of execution program of the nonvolatile memory, so that the execution program may promptly and correctly be recovered from abnormality.

Moreover, the abnormality detecting means of the invention includes block information output means for outputting information on a block in which an abnormality of the execution program is detected.

According to the invention, the block information output means outputs the information on the block in which abnormality of data stored in the nonvolatile memory is detected by the abnormality detecting means, for example, all the data in the block. Thus, since the operator is informed of the abnormal portion of the data in blocks, the operator may check the abnormality of execution program of the nonvolatile memory in blocks, so that the execution program may promptly and correctly be recovered from abnormality.

That is, according to the invention, since the operator is informed of the abnormal portion of the data in the block, the operator may check the abnormality of execution program of the nonvolatile memory in blocks, so that the execution program may promptly and correctly be recovered from abnormality.

Moreover, the abnormality detecting means of the invention comprises recovery informing means for detecting whether or not the block of the rewritable nonvolatile memory, in which abnormality is detected, is recovered from the abnormality after the rewriting operation by the controlling means is completed, and for informing the operator of a result of the detection.

According to the invention, the recovery informing means detects whether the nonvolatile memory is recovered from the abnormality or not after the rewriting of the nonvolatile memory is completed, and informs the operator of a result of the detection. Thus, since the operator is informed of whether the nonvolatile memory is recovered from the abnormality or not, the operator may promptly and appropriately handle the recovery of the execution program from the abnormality based on the result of the recovery.

That is, according to the invention, since the operator is informed of whether the nonvolatile memory is recovered from the abnormality or not, the operator may promptly and appropriately handle the recovery of the execution program from abnormality.

Further, in the embodiments of the invention, the nonvolatile memory is a flash ROM.

According to the invention, since the electrically rewritable nonvolatile memory in the computer apparatus is a flash ROM, the memory may surely be rewritten even in the case where the entire memory area is rewritten or the memory area is rewritten in blocks of a predetermined size into which the memory area is divided.

That is, according to the invention, since the electrically rewritable nonvolatile memory in the computer apparatus is a flash ROM, the memory may surely be rewritten even in the case where the entire memory area is rewritten or the memory area is rewritten in blocks of a predetermined size into which the memory area is divided.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A computer apparatus comprising:
   a rewritable nonvolatile memory having initial memory contents including an operation program for the computer apparatus and instructions for changing memory contents;
   a random access memory;
   a switching control circuit for allocating memory addresses to the random access memory and the rewritable nonvolatile memory;
   program transferring device for transferring the instructions from the nonvolatile memory to the random access memory; and
   controller for controlling the execution of the instructions so that initial contents of the nonvolatile memory are rewritten as updated contents according to the instructions transferred from the nonvolatile memory to the random access memory by the program transferring device.

2. The computer apparatus provided with an electrically rewritable nonvolatile memory of claim 1, the apparatus comprising a protective device for write protection of the memory content changing program transferred to the random access memory by the program transferring device, the protective device adapted to support a first mode, a second mode, and a third mode of the random access memory; the first mode allowing data-reading access of the random access memory, the second mode allowing data-writing access to an entire memory area of the random access memory, and the third mode allowing data-writing access to at least a portion of the memory area to allow defective or abnormal data in the portion to be rewritten.

3. The computer apparatus of claim 2,
   wherein the rewritable nonvolatile memory includes:
      a register storing a protection code;
      an input for receiving input data on requested changes to the memory contents; and
      comparing protection device for comparing the input data with the protection code stored in the register, and for permitting the memory contents to be changed when the input data and the protection code coincide with each other.

4. The computer apparatus of claim 1,
   wherein the controller includes program processor for operating according to a program written in a predetermined memory area of the nonvolatile memory when the instructions are not being executed, and for operating according to the instructions transferred by the program transferring device and stored in a memory area of the random access memory when the execution of the instructions in the nonvolatile memory occurs.

5. The computer apparatus of claim 1,
   wherein the rewritable nonvolatile memory comprises a flash electrically programmable read only memory.

6. The computer apparatus according to claim 1 wherein the program transferring device includes an active state during transferring of the operation program and an inactive state at other times; and wherein
   the memory addresses allocated depend upon whether the program transferring device is in the active state or the inactive state.

7. The computer apparatus according to claim 6 further comprising a processor for processing data, wherein starting processing occurs by referencing an allocated one of said memory addresses in the rewritable nonvolatile memory in the inactive state.

8. The computer apparatus according to claim 6 further comprising a processor for processing data, wherein starting processing occurs by referencing an allocated one of said memory addresses in the random access memory in an active state.

9. A computer apparatus including a central processing unit, the apparatus comprising:
   a rewritable memory element having a nonvolatile characteristic and containing an initial version of an execution program for a processing unit;
   a nonvolatile memory element storing information for updating the initial version of the execution program and storing a rewriting program for rewriting the initial version of the execution program as an updated version for storage in the rewritable memory element;
   a switching control circuit for allocating memory addresses to the rewritable memory element and the nonvolatile memory element;
   a connecting member detachably attached to the nonvolatile memory element; and
   controller for controlling erase and write operations, by inserting the nonvolatile memory element into the connecting member, the erase operation erasing contents of the rewritable memory element, the write operation transferring the information for updating the execution program from the nonvolatile memory element to the rewritable memory element according to the rewriting program stored in the nonvolatile memory element.

10. The computer apparatus of claim 9, the apparatus comprising a switch for switching operation so that,
    during normal operation, the rewritable memory element is allocated with a memory space accessed by a central processing unit, in a memory area for initialization accessed by the central processing unit at the time of activation from a reset condition, and
    during rewriting operation, the rewritable memory element is allocated with a memory area different from the memory area for initialization and the nonvolatile memory element is allocated with the memory area for initialization.

11. The computer apparatus of claim 9,
    wherein a data bus width of the nonvolatile memory element is smaller than a data bus width of the central processing unit, and during the rewriting operation, the central processing unit switches the data bus width to be small when data stored in the nonvolatile memory element are read out from the nonvolatile memory element.

12. The computer apparatus of claim 9 further comprising:
    abnormality detector for detecting an abnormality of the execution program in blocks of a predetermined size for the execution program stored in the electrically rewritable memory element,
    wherein the controller controls so that the execution program is rewritten only for a block in which an abnormality of the execution program is detected by abnormality detector.

13. The computer apparatus of claim 12,
    wherein the abnormality detector includes:
       a data collation device for collating contents of the rewritable memory element and contents of the nonvolatile memory element,
       a collation result storing device for storing a collation result from an output of the data collation device, and a collation result output device for outputting the collation result stored in the collation result storing device.

14. The computer apparatus of claim 12, wherein the abnormality detector includes block information output device for outputting information on a block in which an abnormality of the execution program is detected.

15. The computer apparatus of claim 12, wherein the abnormality detector includes recovery informing device for detecting whether or not the block of the rewritable memory element, in which abnormality is detected, is recovered from the abnormality after the rewriting operation by the controller is completed, and said recovery informing device informing an operator of a result of the detection.

16. An electrically rewritable semiconductor nonvolatile memory comprising:

a nonvolatile memory cell having memory contents and adapted to receive a write enabling signal for granting access to the nonvolatile memory cell;

a register storing a protection code;

an input for receiving input data on requested changes to the memory contents; and comparing protection device for comparing the input data to the protection code stored in the register, the comparing protection device providing a coincidence detection signal indicating permissibility of the memory contents to be changed when the input data and the protection code coincide with each other; and a data protecting circuit adapted to support a first mode, a second mode, and a third mode of the nonvolatile memory; the first mode allowing data-reading access of the nonvolatile memory, the second mode allowing data-writing access to an entire memory area of the nonvolatile memory, and the third mode allowing data-writing access to at least a portion of the memory area to allow defective or abnormal data in the portion to be rewritten.

17. A method for updating an initial software program stored in rewritable nonvolatile memory to an updated software program for execution by a data processing system; the method comprising the steps of:

storing an initial software program and software updating instructions in a rewritable nonvolatile memory associated with the data processing system;

transferring the updating instructions from the rewritable nonvolatile memory to a data storage device during an active state of updating, as opposed to an inactive state, in response to a user input;

allocating a first memory address to a memory location within the rewritable nonvolatile memory in preparation for the inactive state, allocating the first memory address to a memory location in the data storage device in preparation for the active state of updating;

referencing the first memory address during the active state to access the updating instructions on updating the initial software program to an updated software program; and storing the updated software program on the rewritable nonvolatile memory if the updating instructions so permit based upon the user input.

18. The method according to claim 17 further comprising the step of:

deriving the updated software program from the initial software program by manipulating the initial software program in conformance with the software updating instructions.

19. The method according to claim 17 further comprising the step of:

erasing the initial software program before storing the updated software program on the rewritable nonvolatile memory.

20. The method according to claim 17 further comprising the step of providing a random access memory as the data storage device.

21. The method according to claim 17 further comprising the step of providing additional rewritable nonvolatile memory as the data storage device.

* * * * *